(12) United States Patent
Chen et al.

(10) Patent No.: US 12,309,342 B2
(45) Date of Patent: May 20, 2025

(54) PHOTOGRAPHING METHOD, IMAGE PROCESSING METHOD, AND ELECTRONIC DEVICE

(71) Applicant: Huawei Technologies Co., Ltd., Shenzhen (CN)

(72) Inventors: Tianluo Chen, Shenzhen (CN); Xin Ding, Shenzhen (CN); Heng Zhou, Shenzhen (CN); Yuewan Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 18/004,140

(22) PCT Filed: Jun. 30, 2021

(86) PCT No.: PCT/CN2021/103747
§ 371 (c)(1),
(2) Date: Jan. 3, 2023

(87) PCT Pub. No.: WO2022/002158
PCT Pub. Date: Jan. 6, 2022

(65) Prior Publication Data
US 2023/0262205 A1  Aug. 17, 2023

(30) Foreign Application Priority Data
Jul. 3, 2020 (CN) .......................... 202010636970.6

(51) Int. Cl.
*H04N 13/117* (2018.01)
*H04N 13/156* (2018.01)
(Continued)

(52) U.S. Cl.
CPC ......... *H04N 13/117* (2018.05); *H04N 13/156* (2018.05); *H04N 13/268* (2018.05);
(Continued)

(58) Field of Classification Search
CPC .. H04N 13/117; H04N 13/156; H04N 13/261; H04N 13/268; H04N 13/293;
(Continued)

(56) References Cited

U.S. PATENT DOCUMENTS

| 2006/0125917 A1* | 6/2006 | Cha | H04N 13/279 348/51 |
| 2012/0038747 A1* | 2/2012 | Kim | H04N 1/00347 348/47 |

(Continued)

FOREIGN PATENT DOCUMENTS

| CN | 105115445 A | * 12/2015 | ........... G01B 11/245 |
| CN | 105825544 A | * 8/2016 | ............. G06T 15/04 |

(Continued)

OTHER PUBLICATIONS

Hedman Peter, et al., "Viewpoint-Free Photography for Virtual Reality," Springer, Nature Switzerland, Real VR, LNCS 11900, Mar. 3, 2020, XP047545555, 35 pages.

(Continued)

*Primary Examiner* — Behrooz M Senfi
(74) *Attorney, Agent, or Firm* — Conley Rose, P.C.

(57) ABSTRACT

A photographing method implemented by an electronic device includes receiving a photographing instruction of a user, shooting a primary camera image using a primary camera, shooting a wide-angle image using a wide-angle camera, and generating a three-dimensional (3D) image based on the primary camera image and the wide-angle image, where the 3D image includes a plurality of frames of images that is converted from a 3D viewing angle and corresponds to different viewing angles.

20 Claims, 21 Drawing Sheets

(51) Int. Cl.
*H04N 13/268* (2018.01)
*H04N 13/293* (2018.01)
*H04N 23/62* (2023.01)
*H04N 23/63* (2023.01)
*H04N 23/698* (2023.01)
*H04N 23/90* (2023.01)

(52) U.S. Cl.
CPC ........... *H04N 13/293* (2018.05); *H04N 23/62* (2023.01); *H04N 23/632* (2023.01); *H04N 23/698* (2023.01); *H04N 23/90* (2023.01)

(58) Field of Classification Search
CPC .... H04N 23/62; H04N 23/631; H04N 23/632; H04N 23/698; H04N 23/90; H04N 23/80
USPC .......................................................... 348/47
See application file for complete search history.

(56) References Cited

U.S. PATENT DOCUMENTS

| | | | | |
|---|---|---|---|---|
| 2014/0192245 | A1* | 7/2014 | Lee | .................... H04N 1/00381 348/333.05 |
| 2016/0028949 | A1 | 1/2016 | Lee et al. | |
| 2016/0323561 | A1 | 11/2016 | Jin et al. | |
| 2018/0288397 | A1* | 10/2018 | Lee | ...................... H04N 13/204 |
| 2019/0279383 | A1* | 9/2019 | Angelova | .............. G06N 3/045 |

FOREIGN PATENT DOCUMENTS

| | | | | |
|---|---|---|---|---|
| CN | 106576143 | A | | 4/2017 |
| CN | 108629829 | A | | 10/2018 |
| CN | 109238288 | A * | 1/2019 | ........... G01C 21/206 |
| CN | 110248081 | A | | 9/2019 |
| CN | 111901480 | A * | 11/2020 | ............. G06F 3/048 |
| WO | WO-2012067021 | A1 * | 5/2012 | ........... H04N 13/026 |
| WO | 2020069049 | A1 | | 4/2020 |

OTHER PUBLICATIONS

Simon Niklaus et al., "3D Ken Burns Effect from a Single Image," ACM Trans. Graph., vol. 38, No. 6, Article 184. Publication date: Nov. 2019, 15 pages.

Peter Hedman et al., "Instant 3D Photography," UCL, FaceBook, 2018, 4 pages.

* cited by examiner

PHOTOGRAPHING METHOD, IMAGE PROCESSING METHOD, AND ELECTRONIC DEVICE

CROSS-REFERENCE TO RELATED APPLICATIONS

This is a U.S. National Stage of International Patent Application No. PCT/CN2021/103747 filed on Jun. 30, 2021, which claims priority to Chinese Patent Application No. 202010636970.6 filed on Jul. 3, 2020, both of which are hereby incorporated by reference in their entireties.

TECHNICAL FIELD

This application relates to the field of image processing technologies, and in particular, to a photographing method, an image processing method, and an electronic device.

BACKGROUND

A common two-dimensional (2D) image (picture/photo) is a planar image. Usually, only effects of 2D zooming and panning can be displayed, and authenticity is poor. Compared with a 2D image, a three-dimensional (3D) image is a stereo image, which has a sense of presence and depth of field, and has stronger authenticity.

For example, a photo shot by using an electronic device, for example, a mobile phone is usually a common 2D image. The shot common 2D image may be processed with a dynamic effect to form a video, which is used as a dynamic picture frame or is applied to video editing and the like. In addition, for a single common 2D image, 3D effect processing may also be performed to form a three-dimensional image, to implement more realistic movement and conversion effects at a 3D viewing angle and the like.

Currently, there are problems, such as complex operations, and a small field of view and a poor effect of a converted three-dimensional image, in converting a common 2D image into a three-dimensional image.

SUMMARY

This application provides a photographing method, an image processing method, and an electronic device. An operation of converting a common 2D image into a three-dimensional image is simple, and the obtained three-dimensional image has a large field of view and a better effect, which can improve user experience.

To resolve the foregoing technical problem, according to a first aspect, an implementation of this application provides a photographing method. The method is applied to an electronic device and includes: receiving a photographing instruction of a user, shooting a primary camera image by using a primary camera, and shooting a wide-angle image by using a wide-angle camera; and generating a three-dimensional image based on the primary camera image and the wide-angle image, where the three-dimensional image includes a plurality of frames of images that are converted from a three-dimensional viewing angle and correspond to different viewing angles. According to the photographing method of the three-dimensional image provided in this application, the three-dimensional image may be shot and generated based on a single operation of the user, and the operation thereof is simple. In addition, the wide-angle image can increase a conversion range of a viewing angle of the primary camera image, and the obtained three-dimensional image has a larger field of view and a better effect, thereby improving user experience in photographing.

In a possible implementation of the first aspect, after the generating a three-dimensional image, the method further includes: directly displaying three-dimensional images at different viewing angles. For example, images at different viewing angles may be displayed in a form of video playback, that is, the three-dimensional image is displayed.

In a possible implementation of the first aspect, after the generating a three-dimensional image, the method further includes: receiving a viewing angle conversion operation performed by the user on the three-dimensional image, and displaying a three-dimensional image at a viewing angle corresponding to the viewing angle conversion operation. For example, images at different viewing angles may be displayed based on an operation such as sliding by the user, that is, the three-dimensional image is displayed.

In a possible implementation of the first aspect, the generating a three-dimensional image based on the primary camera image and the wide-angle image includes: obtaining a point cloud of the primary camera image based on the primary camera image, obtaining a point cloud of the wide-angle image based on the wide-angle image, and obtaining a binocular point cloud based on the primary camera image and the wide-angle image; obtaining a fused three-dimensional point cloud based on the point cloud of the primary camera image, the point cloud of the wide-angle image, and the binocular point cloud; and obtaining the three-dimensional image based on the fused three-dimensional point cloud. By fusing three types of point clouds, a 3D point cloud model with a wider field of view can be formed, a density of point clouds in an overlapping area of the field of view is increased, a quantity of points that need to be filled after viewing angle conversion is reduced, accuracy obtained after 3D viewing angle conversion is improved, and an effect obtained after 3D viewing angle conversion can be improved.

In a possible implementation of the first aspect, obtaining a point cloud of an image includes: obtaining a pixel depth of each pixel in the image through depth prediction by a neural network; and obtaining the point cloud based on the pixel depth.

In a possible implementation of the first aspect, the obtaining a fused three-dimensional point cloud based on the point cloud of the primary camera image, the point cloud of the wide-angle image, and the binocular point cloud includes: performing depth calibration on the point cloud of the wide-angle image and the binocular point cloud based on the point cloud of the primary camera image; and fusing the point cloud of the primary camera image with a calibrated point cloud of the wide-angle image and a calibrated binocular point cloud, to obtain the fused three-dimensional point cloud.

In a possible implementation of the first aspect, the fusing the point cloud of the primary camera image with a calibrated point cloud of the wide-angle image and a calibrated binocular point cloud includes: unifying the calibrated point cloud of the wide-angle image, the calibrated binocular point cloud, and the point cloud of the primary camera image in a same coordinate system through camera parameter conversion. The same coordinate system may be a world coordinate system.

In a possible implementation of the first aspect, the obtaining the three-dimensional image based on the fused three-dimensional point cloud includes: determining a first conversion viewing angle; obtaining a first point cloud corresponding to the first conversion viewing angle, and performing image rendering and supplement based on the first point cloud to form a first two-dimensional image corresponding to the first conversion viewing angle; switching different conversion viewing angles, and generating two-dimensional images at corresponding viewing angles; and forming the three-dimensional image by using a plurality of frames of two-dimensional images corresponding to different viewing angles.

In a possible implementation of the first aspect, after the receiving a photographing instruction of a user, the method further includes: enabling the primary camera and the wide-angle camera.

In a possible implementation of the first aspect, before the receiving a photographing instruction of a user, the method further includes: receiving an operation of invoking a camera function by the user, and displaying a photographing interface.

In a possible implementation of the first aspect, when the operation of invoking the camera function by the user is received, the primary camera may be enabled, or both the primary camera and the wide-angle camera may be enabled.

In a possible implementation of the first aspect, the photographing interface further includes a selection control for a camera preview picture, and the selection control for a camera preview picture includes a selection control for a preview picture of the primary camera and a selection control for a preview picture of the wide-angle camera. The method further includes: if a triggering operation performed by the user on the selection control for a preview picture of the primary camera is detected, displaying the preview picture corresponding to the primary camera; and if a triggering operation performed by the user on the selection control for a preview picture of the wide-angle camera is detected, displaying the preview picture corresponding to the wide-angle camera. The selection control for a preview picture of the primary camera and the selection control for a preview picture of the wide-angle camera are set. This can help the user to view the preview image of the corresponding camera, help the user to determine a target photographing area, and shoot a more ideal three-dimensional image.

According to a second aspect, an implementation of this application provides an image processing method, applied to an electronic device, and including: obtaining a first image and a second image, where the first image includes first content, and the second image includes the first content of the first image and includes second content other than the first content; generating a three-dimensional image based on the first image and the second image, where the three-dimensional image includes a plurality of frames of images that are converted from a three-dimensional viewing angle and correspond to different viewing angles. According to the image processing method provided in this application, a conversion range of a viewing angle of the first image can be increased by using the second image, and the obtained three-dimensional image has a larger field of view and a better effect, thereby improving user experience in image processing.

In a possible implementation of the second aspect, after the generating a three-dimensional image, the method further includes: directly displaying three-dimensional images corresponding to different viewing angles.

In a possible implementation of the second aspect, after the generating a three-dimensional image, the method further includes: receiving a viewing angle conversion operation performed by a user on the three-dimensional image, and displaying a three-dimensional image at a viewing angle corresponding to the viewing angle conversion operation.

In a possible implementation of the second aspect, the generating a three-dimensional image based on the first image and the second image includes: obtaining a point cloud of the first image based on the first image, obtaining a point cloud of the second image based on the second image, and obtaining a point cloud of a common area based on the first image and the second image; obtaining a fused three-dimensional point cloud based on the point cloud of the first image, the point cloud of the second image, and the point cloud of the common area; and obtaining the three-dimensional image based on the fused three-dimensional point cloud.

In a possible implementation of the second aspect, obtaining the point cloud of the image includes: obtaining a pixel depth of each pixel in the image through depth prediction by a neural network; and obtaining the point cloud based on the pixel depth.

In a possible implementation of the second aspect, the obtaining a fused three-dimensional point cloud based on the point cloud of the first image, the point cloud of the second image, and the point cloud of the common area includes: performing depth calibration on the point cloud of the second image and the point cloud of the common area based on the point cloud of the first image; and fusing the point cloud of the first image with a calibrated point cloud of the second image and a calibrated point cloud of the common area, to obtain the fused three-dimensional point cloud.

In a possible implementation of the second aspect, the fusing the point cloud of the first image with a calibrated point cloud of the second image and a calibrated point cloud of the common area includes: unifying the calibrated point cloud of the second image, the calibrated point cloud of the common area, and the point cloud of the first image in a same coordinate system. The same coordinate system may be a world coordinate system.

In a possible implementation of the second aspect, the obtaining the three-dimensional image based on the fused three-dimensional point cloud includes: determining a first conversion viewing angle; obtaining a first point cloud corresponding to the first conversion viewing angle, and performing image rendering and supplement based on the first point cloud to form a first two-dimensional image corresponding to the first conversion viewing angle; switching different conversion viewing angles, and generating two-dimensional images at corresponding viewing angles; and forming the three-dimensional image by using a plurality of frames of two-dimensional images corresponding to different viewing angles.

The image processing method provided in this application corresponds to the photographing method provided in any one of the first aspect and/or the possible implementations of the first aspect, and therefore, can also implement beneficial effects (or advantages) of the photographing method provided in the first aspect.

According to a third aspect, an implementation of this application provides a photographing method, applied to a system including a first electronic device and a second electronic device, and including: The first electronic device receives a photographing instruction of a user, shoots a primary camera image by using a primary camera, and shoots a wide-angle image by using a wide-angle camera. The first electronic device sends the primary camera image and the wide-angle image to the second electronic device. The second electronic device generates a three-dimensional image based on the primary camera image and the wide-angle image, where the three-dimensional image includes a plurality of frames of images that are converted from a three-dimensional viewing angle and correspond to different viewing angles. The second electronic device sends the three-dimensional image to the first electronic device. That is, another electronic device other than the electronic device may generate the three-dimensional image. The second electronic device may be an electronic device, for example, a server.

According to a fourth aspect, an implementation of this application provides an image processing method, applied to a system including an electronic device and a server, and including: The electronic device obtains a first image and a second image, where the first image includes first content, and the second image includes the first content of the first image and includes second content other than the first content. The electronic device sends the first image and the second image to the server. The server generates a three-dimensional image based on the first image and the second image, where the three-dimensional image includes a plurality of frames of images that are converted from a three-dimensional viewing angle and correspond to different viewing angles. The server sends the three-dimensional image to the electronic device. That is, the server other than the electronic device may generate the three-dimensional image.

According to a fifth aspect, an implementation of this application provides an electronic device, including: a memory, configured to store a computer program, where the computer program includes program instructions; and a control component, configured to execute the program instructions, to enable the electronic device to perform the photographing method provided in any one of the first aspect and/or the possible implementations of the first aspect, or enable the electronic device to perform the image processing method provided in any one of the second aspect and/or the possible implementations of the second aspect, or enable the electronic device to perform the image processing method provided in any one of the third aspect and/or the possible implementations of the third aspect.

According to a sixth aspect, an implementation of this application provides a computer-readable storage medium. The computer-readable storage medium stores a computer program, and the computer program includes program instructions. The program instructions are run by a computer to enable the computer to perform the photographing method provided in any one of the first aspect and/or the possible implementations of the first aspect, or enable the computer to perform the image processing method provided in any one of the second aspect and/or the possible implementations of the second aspect, or enable the computer to perform the image processing method provided in any one of the third aspect and/or the possible implementations of the third aspect.

BRIEF DESCRIPTION OF DRAWINGS

To describe technical solutions of this application more clearly, the following briefly describes the accompanying drawings used in the descriptions of the embodiments.

DESCRIPTION OF EMBODIMENTS

The following further describes technical solutions in this application with reference to accompanying drawings.

A two-dimensional image shot by using a common photographing device usually can display only effects of 2D zooming and panning. If experience with an image with stronger authenticity is wanted, a three-dimensional image needs to be provided. The three-dimensional image discussed in embodiments of this application is a three-dimensional image/video formed by a plurality of frames of images, which can display, for example, different pictures at a plurality of viewing angles centered around a photographed object for a user, thereby providing the user with a sense of immersion, or enabling the user to observe more details than a conventional 2D image, such as details shielded at a single viewing angle. On one hand, the user can obtain such a photo by moving a photographing location of the user and with reference to a specific image processing method. On the other hand, with development of a neural network technology, improvement of image prediction and learning capabilities provides a possibility of performing 3D viewing angle conversion on a 2D image to form a three-dimensional image.

Figure 1:
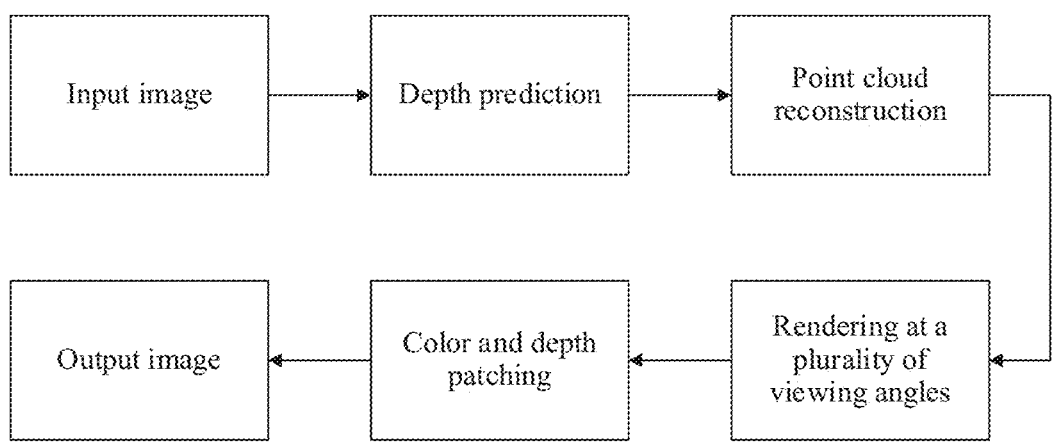
FIG. 1 is a schematic diagram of a process of converting a single 2D image into a three-dimensional image obtained through 3D viewing angle conversion according to some implementations of the conventional technology.

Technical solutions for performing 3D viewing angle conversion on the 2D image include the following several types:

In a first type, a process thereof may be shown in FIG. 1. The 2D image may be used as an input image in a neural network. Depth prediction is performed on the 2D image by using the neural network, to obtain a depth of each pixel in the 2D image, and construct a 3D point cloud model (that is, perform point cloud reconstruction). An imaginary camera (a viewing angle) is placed in the 3D point cloud model, and rendering at a plurality of viewing angles is performed by simulating rotation of the camera, so that a point cloud model at a corresponding viewing angle can be obtained. In addition, inference prediction and completion (patching) of elements such as a color and a depth are performed on a part that is not photographed in an original image, so that an image at the corresponding viewing angle can be obtained. By processing continuous viewing angles, a three-dimensional image obtained after 3D viewing angle conversion may be formed as an output image, to support movement and conversion effects at a 3D viewing angle.

A picture of the three-dimensional image formed in this solution is limited to a single image. Consequently, an angle at which the three-dimensional image can be moved and converted is excessively small. Content other than 2D image content cannot be displayed in a field of view, that is, content in a place not photographed by the camera cannot be displayed.

In a second type, two images are simultaneously shot by using a binocular camera. The binocular camera performs simultaneous photographs by using two cameras close to each other. Based on a stereo vision technology, content of the two cameras is calculated by using a stereo matching imaging algorithm (for example, a three-dimensional block matching algorithm) and with reference to a camera parameter to obtain a binocular depth map. A 3D point cloud model is established based on the binocular depth map, and viewing angle conversion is subsequently performed to form a three-dimensional image obtained after 3D viewing angle conversion, to implement movement and conversion effects at a 3D viewing angle.

In this solution, due to a limitation of a baseline of a photographing electronic device, for example, a mobile phone, depth accuracy of the binocular depth map is poor, especially a depth of a remote background cannot be recovered, and therefore, the binocular depth map can only be used for near-field recovery. In addition, in a binocular camera manner, only a common part of the two images are reserved, and rotation of a visual angle of the binocular camera is still excessively small.

In a third type, a large field-of-view image and a 3D model are synthesized by using a plurality of local images and corresponding depth maps. Because binocular depth accuracy of a binocular camera is poor, it is easy to incorrectly estimate depths of some objects in a scenario. Therefore, in this solution, a user performs photographing a plurality of times on a scenario in which 3D viewing angle conversion needs to be performed to obtain a plurality of images, to obtain details at each part and a corresponding depth image, to form a plurality of point cloud models. Then, point clouds at the parts are spliced to together form a 3D point cloud model. The 3D point cloud model is used, and viewing angle conversion is subsequently performed to form a three-dimensional image obtained after 3D viewing angle conversion, to implement movement and conversion effects at a 3D viewing angle.

In this solution, the user needs to perform photographing at different angles (especially, for a near field) to perform multi-angle point cloud combination. Consequently, user operations are complex.

This application provides a photographing method, and the photographing method is a photographing method for implementing 3D viewing angle conversion by using a 2D image of a wide-angle image shot by a wide-angle camera 1932. A user shoots photos by simultaneously using a primary camera 1931 and the wide-angle camera 1932 of a mobile phone 100, to respectively obtain a primary camera image and a wide-angle image, and obtain a binocular image based on the primary camera image and the wide-angle image. When 3D viewing angle conversion is performed, the primary camera image shot by the high-resolution primary camera 1931 may be used as a primary image, and the wide-angle image shot by the wide-angle camera 1932 with a wider field of view may be used as an auxiliary image. Depths of the primary camera image, the wide-angle image, and the binocular image are estimated by using a neural network, to determine the depth of the primary camera image, the depth of the wide-angle image, and the depth of the binocular image. Correction and supplement are performed among the depth of the primary camera image, the depth of the wide-angle image, and the depth of the binocular image, so that an overall depth of a scenario can be obtained, and a 3D point cloud can be constructed to form a fused three-dimensional point cloud, to enhance accuracy of the 3D point cloud. Based on the fused three-dimensional point cloud, a three-dimensional image can be obtained by switching different continuous viewing angles. The three-dimensional image essentially includes a plurality of frames of images. A display manner of the three-dimensional image may be automatic playback, or the viewing angles may be switched based on an operation of the user, for example, sliding.

In addition, the high-resolution primary camera image may be used as a start field of view to perform viewing angle conversion at a large angle. Information that is not included in the primary camera image but is recorded in the wide-angle image can appear in a converted image, thereby improving user experience of obtaining the three-dimensional image after 3D viewing angle conversion.

To implement the foregoing photographing method of the three-dimensional image, this application provides an electronic device. The electronic device includes but is not limited to devices that can perform photographing and image processing, such as a mobile phone, a tablet computer, a television, a notebook computer, an ultra-mobile personal computer (ultra-mobile personal computer, UMPC), a handheld computer, a netbook, a personal digital assistant (personal digital assistant, PDA), a wearable device, a virtual reality device, and a camera.

Figure 2:
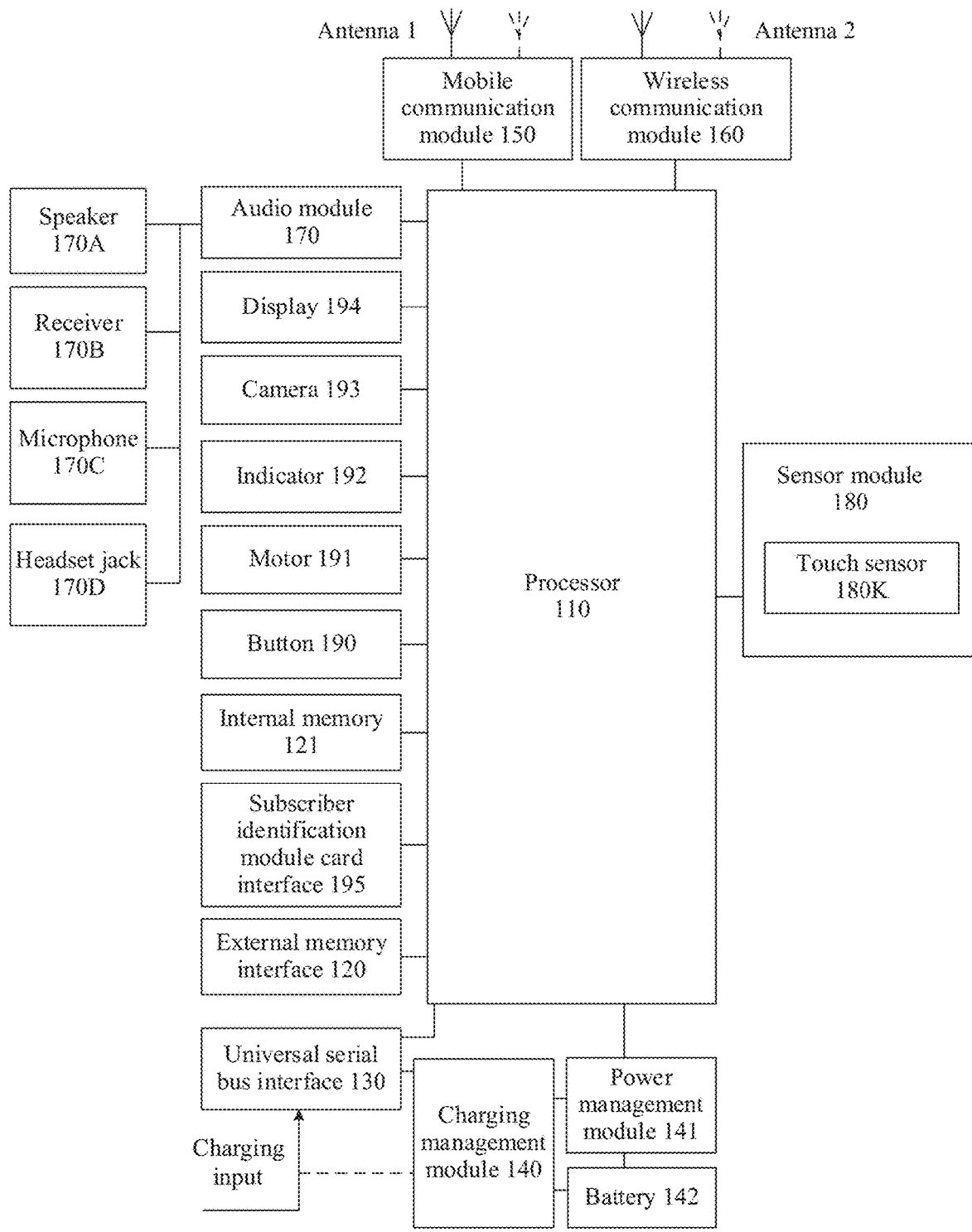
FIG. 2 is a schematic diagram of a structure of a mobile phone according to some implementations of this application.

FIG. 2 is a schematic diagram of a structure of a mobile phone 100 that is used as an example of an electronic device for implementing a photographing method in this application according to an implementation of this application.

The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include sensors such as a touch sensor 180K.

It may be understood that the structures illustrated in embodiments of the present invention do not constitute a specific limitation on the mobile phone 100. In some other embodiments of this application, the mobile phone 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The processor 110 may generate an operation control signal based on instruction operation code and a time sequence signal, to complete control of instruction reading and instruction execution. A memory may be further disposed in the processor 110, and is configured to store instructions and data.

The mobile phone 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile phone 100 may include one or N displays 194, where N is a positive integer greater than 1.

The mobile phone 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the mobile phone 100 may include one or N cameras 193, where N is a positive integer greater than 1.

Figure 3:
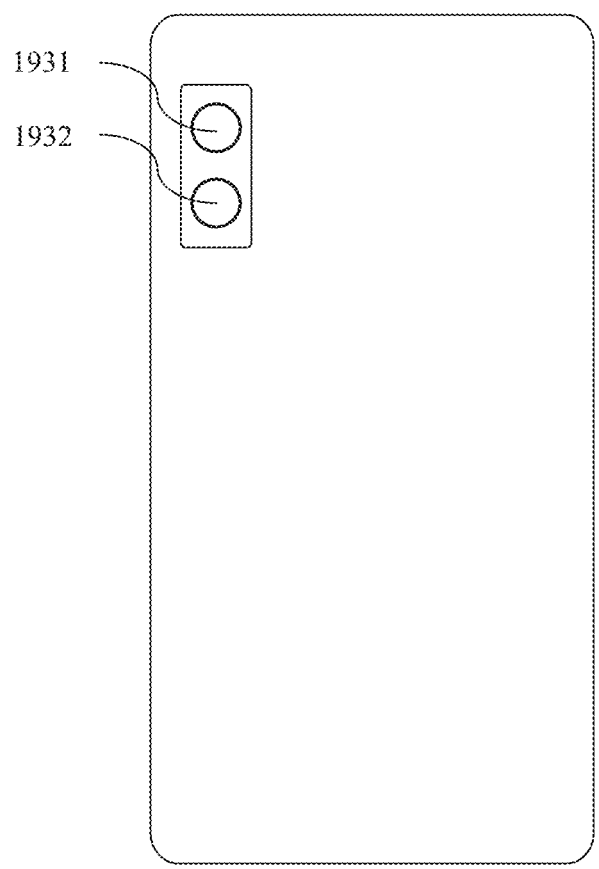
FIG. 3 is a schematic diagram of a rear structure of a mobile phone according to some implementations of this application.

With reference to FIG. 3, in an implementation of this application, the mobile phone 100 includes at least two cameras: a primary camera 1931 and a wide-angle camera 1932. A photographing method provided in this application is a photographing method for implementing 3D viewing angle conversion by using a 2D image of a wide-angle image shot by the wide-angle camera 1932. When a user shoots a photo, the mobile phone 100 performs shooting by using the primary camera 1931 and the wide-angle camera 1932 of the mobile phone 100, to respectively obtain a primary camera image and a wide-angle image, and generate a three-dimensional image based on the primary camera image and the wide-angle image.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 1M. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs instructions stored in the internal memory 121 and/or instructions stored in the memory disposed in the processor, to perform various function applications and data processing of the mobile phone 100. According to the implementation of this application, the memory may be configured to store instructions. After running the instructions, the processor implements the photographing method for a three-dimensional image according to this application. The memory may also be configured to store a shot image and an intermediate product required for generating a three-dimensional image.

The mobile phone 100 further includes a touch sensor 180K, which is also referred to as a "touch device". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the mobile phone 100 at a location different from a location of the display 194. For example, when entering a photographing application based on a technical solution of this application, the user may start shooting of a three-dimensional image by touching a control on a photographing application interface.

Figure 4A:
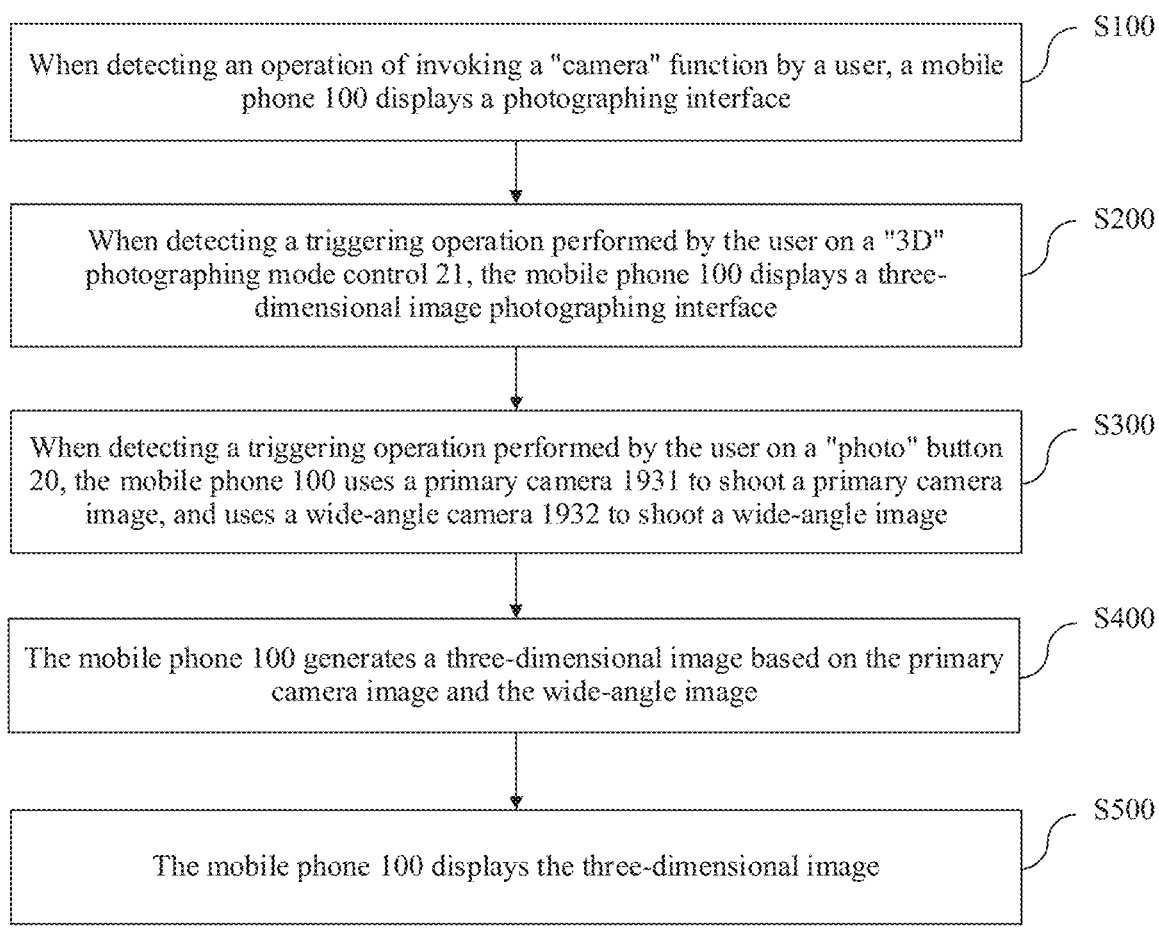
FIG. 4A to FIG. 4C are schematic diagrams of a process of a photographing method provided in this application according to some implementations of this application.

With reference to FIG. 4A, in an implementation of this application, a process of shooting a three-dimensional image by the mobile phone 100 includes:

S100: When detecting (receiving) an operation of invoking a "camera" function by the user, the mobile phone 100 displays a photographing interface.

It should be noted that, invoking herein may be that the user enables a camera application, or may be that the mobile phone 100 invokes the camera function by using another application.

Figure 5A:
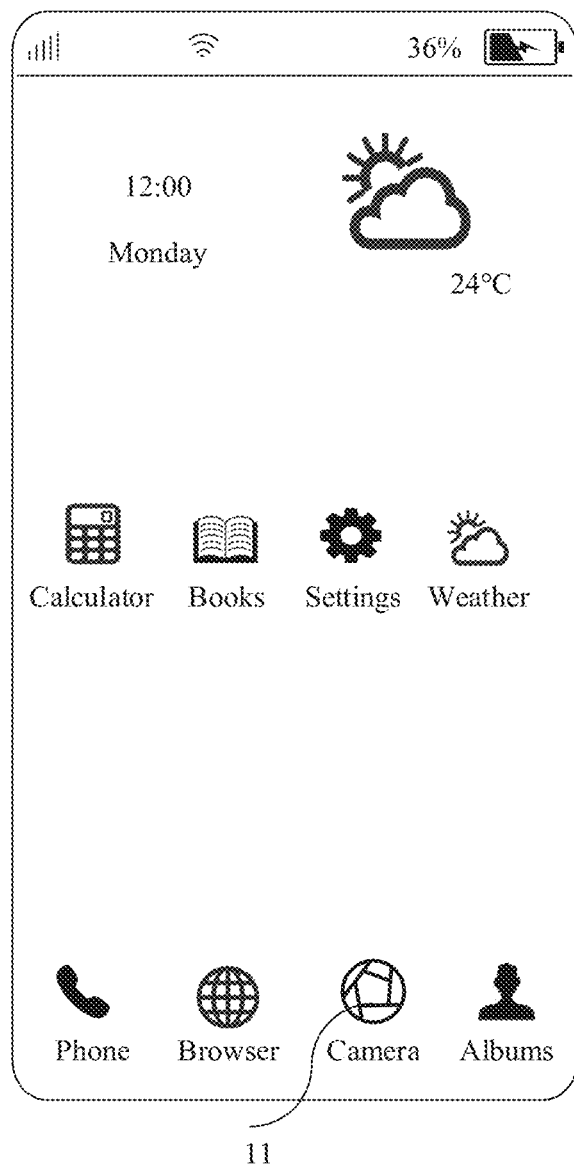
FIG. 5A to FIG. 5H are schematic diagrams of some display interfaces of a mobile phone 100 according to some implementations of this application.

As shown in FIG. 5A, a camera application identifier 11 of a camera application and application identifiers of other applications such as phone and browser that are displayed on a screen (a display interface) of the mobile phone 100.

The user taps the camera application identifier 11 on the screen. If the mobile phone 100 detects a triggering operation performed by the user on the camera application identifier 11, the mobile phone 100 displays a display interface shown in FIG. 5B. The display interface includes but is not limited to an image display area 10 and a photographing button 20. The image display area 10 is used to display a preview picture obtained by using a camera, and the photographing button 20 is used by the user to shoot a photo by tapping.

Figure 5B:
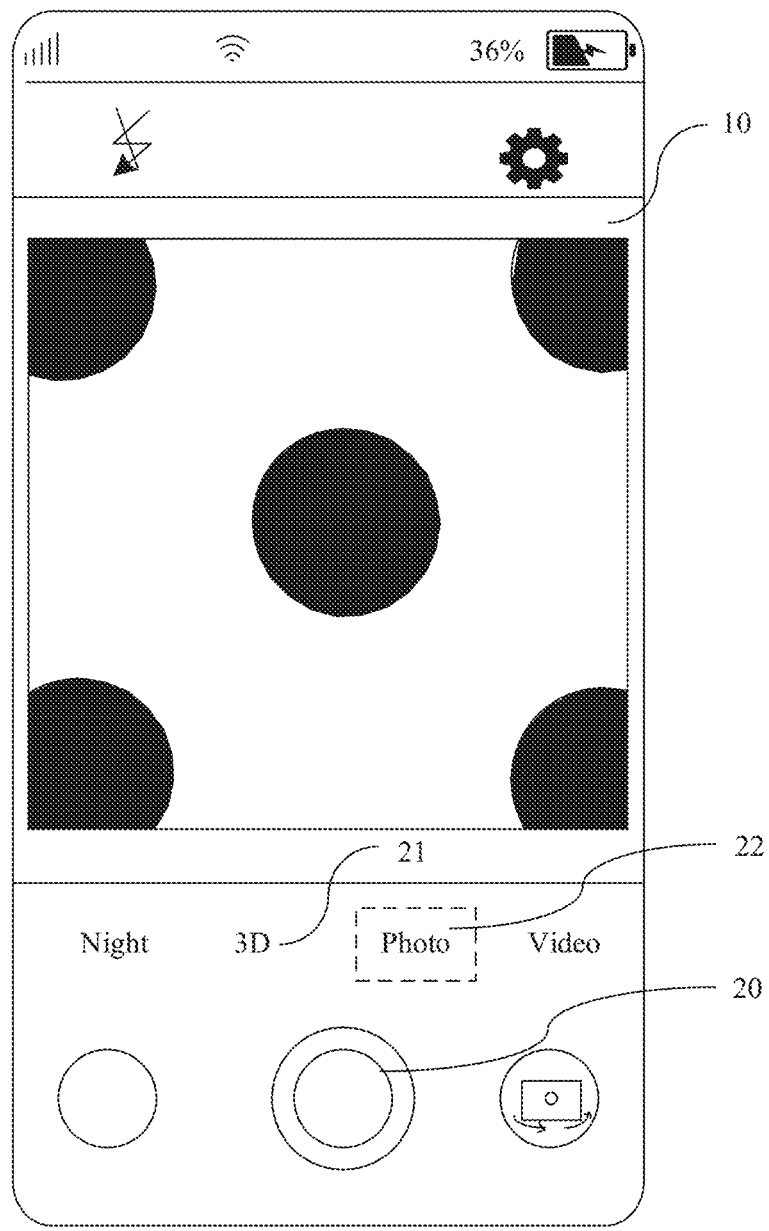

It should be noted that, after receiving the operation of invoking the "camera" function by the user, the mobile phone 100 may first enable the primary camera 1931, the display interface may be the photographing interface shown in FIG. 5B that corresponds to a "photo" mode 22 displayed by default, and the image display area 10 may by default display a preview picture (image) obtained by using the primary camera 1931.

In addition, the display interface may further include a "3D" photographing mode control 21 and other controls such as a "night" photographing mode control and a "video" mode control, so that the user can select the photographing modes by using these controls. Further, the display interface may also include controls such as a flash control and a setting control, which may be selected based on a requirement.

S200: When detecting a triggering operation performed by the user on the "3D" photographing mode control 21, the mobile phone 100 displays a three-dimensional image photographing interface.

If wanting to shoot a three-dimensional image, the user may tap the "3D" photographing mode control 21 on the photographing interface shown in FIG. 5B. When detecting a triggering operation performed by the user on the "3D" photographing mode control 21, the mobile phone 100 displays a three-dimensional image photographing interface shown in FIG. 5C. The three-dimensional image photographing interface includes an image display area 11. The image display area 11 may by default display a preview picture (image) obtained by using the primary camera 1931.

In another implementation of this application, if detecting a triggering operation performed by the user on the "3D" photographing mode control 21, the mobile phone 100 may further enable the wide-angle camera 1932.

Figure 5C:
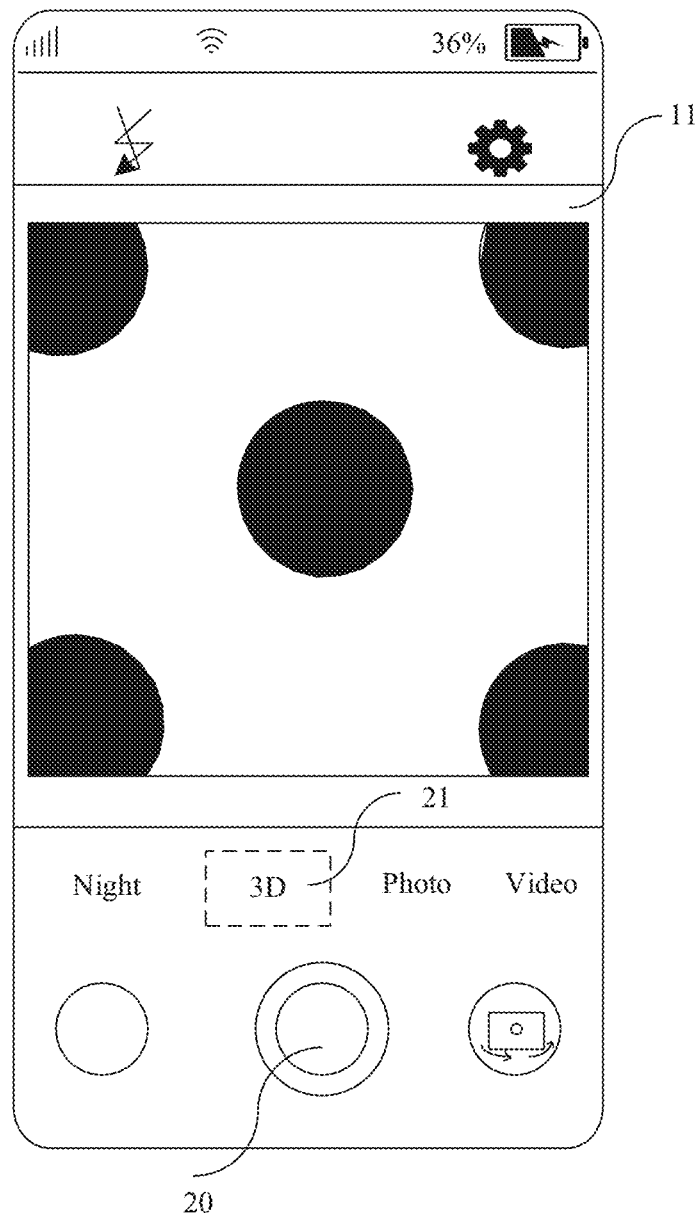
Figure 5D:
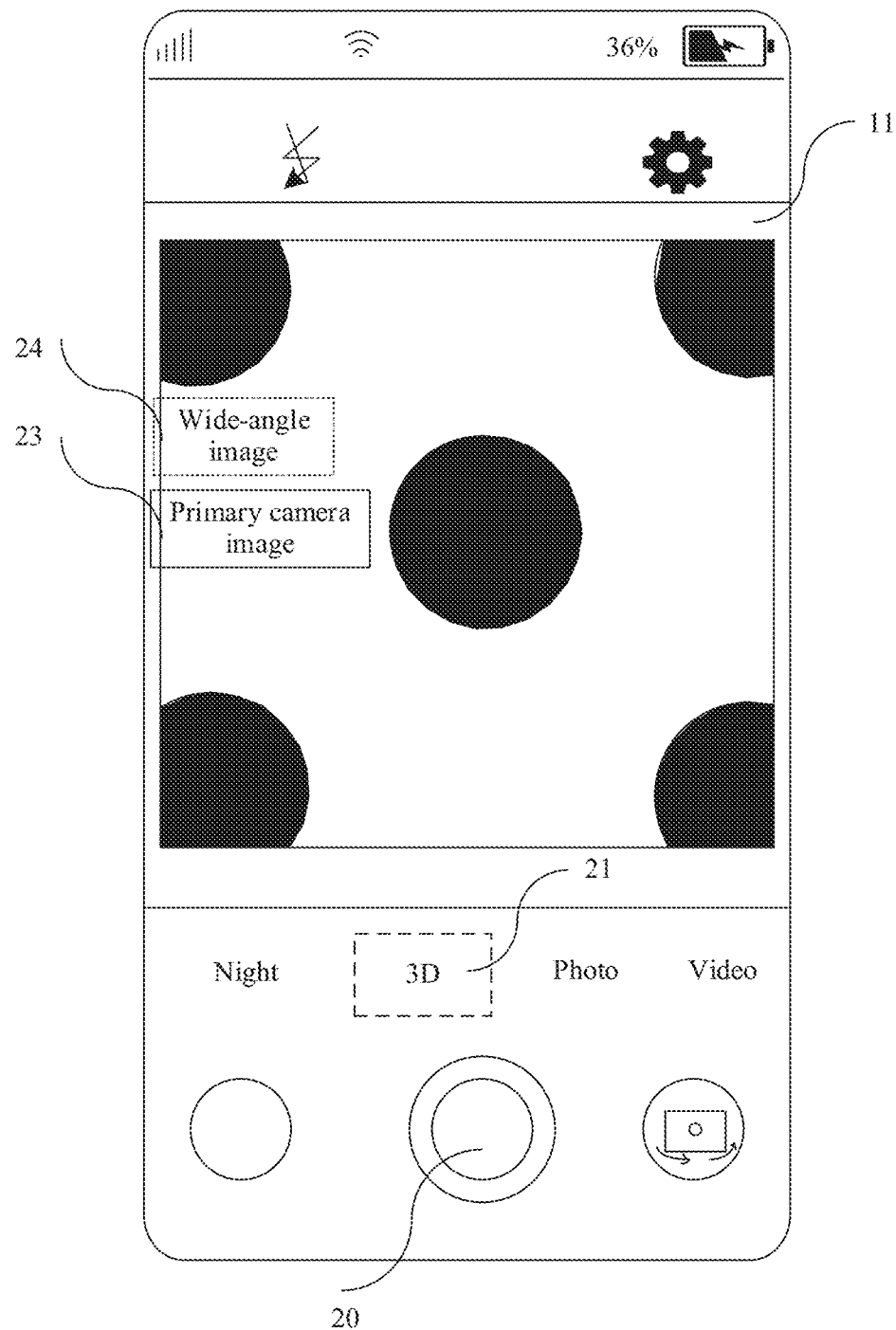

In addition, in another implementation of this application, as shown in FIG. 5D, a "primary camera image" control 23 and a "wide-angle image" control 24 may be further displayed on the image display area 11. The "primary camera image" control 23 is a selection control for a preview picture of the primary camera, and the "wide-angle image" control 24 is a selection control for a preview picture of the wide-angle camera. When detecting a triggering operation performed by the user on the "3D" photographing mode control 21, the mobile phone 100 may by default display, in the image display area 11, a preview image shown in FIG. 5D that is obtained at a viewing angle of the primary camera 1931. If detecting a triggering operation performed by the user on the "wide-angle image" control 24, the mobile phone 100 may display a preview image shown in FIG. 5E that is obtained at a viewing angle of the wide-angle camera 1932, so that the user can view whether an object that the user wants to photograph is included in a range that can be photographed by the wide-angle camera 1932. If detecting a triggering operation performed by the user on the "primary camera image" control 23, the mobile phone 100 may display the preview image shown in FIG. 5D that is obtained at the viewing angle of the primary camera 1931.

Certainly, the mobile phone 100 may enable the wide-angle camera 1932 when the mobile phone 100 detects a triggering operation performed by the user on the wide-angle image control 24.

Figure 5E:
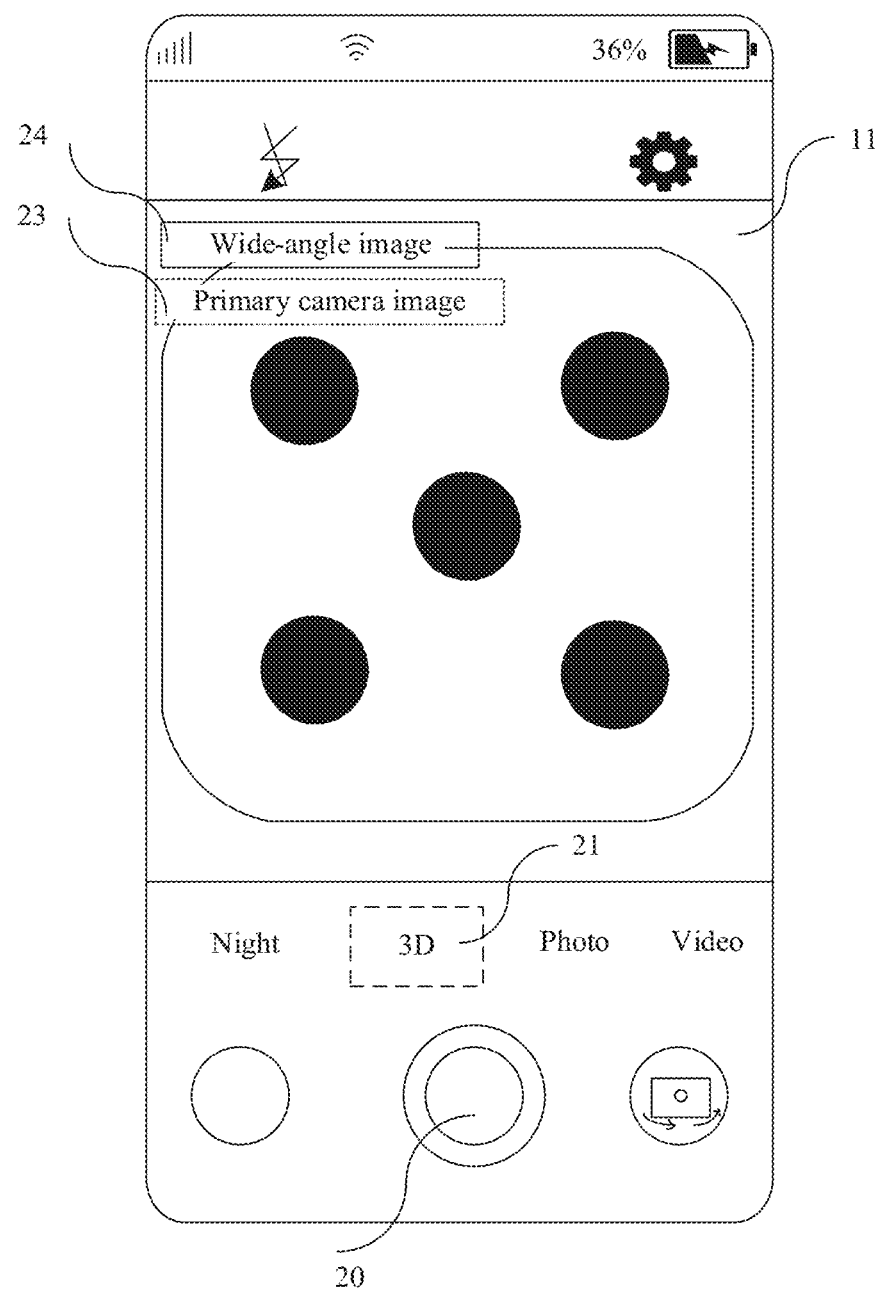

In this application, when detecting the operation of invoking the "camera" function by the user in step S100, the mobile phone 100 may also enable both the primary camera 1931 and the wide-angle camera 1932, and display any display interface shown in FIG. 5C to FIG. 5E. If a subsequent photographing mode is a normal photographing mode, and the w % ide-angle camera 1932 does not need to be used, the mobile phone 100 may shoot a photo without using the wide-angle camera 1932 or shoot a photo after disabling the wide-angle camera 1932. This may be selected based on a requirement.

S300: When detecting a triggering operation performed by the user on the "photo" button 20, the mobile phone 100 uses the primary camera 1931 to shoot a primary camera image, and uses the wide-angle camera 1932 to shoot a wide-angle image.

The user may tap the "photo" button 20 on any display interface shown in FIG. 5C to FIG. 5E to shoot a photo.

The mobile phone 100 may simultaneously use the primary camera 1931 and the wide-angle camera 1932 to respectively shoot a primary camera image and a wide-angle image; or may first use the primary camera 1931 to shoot a primary camera image, and then use the wide-angle camera 1932 to shoot a wide-angle image; or may first use the wide-angle camera 1932 to shoot a wide-angle image, and then use the primary camera 1931 to shoot a primary camera image. This may be selected based on a requirement.

Certainly, the mobile phone 100 may enable the wide-angle camera 1932 when the mobile phone 100 detects a triggering operation performed by the user on the "photo" button 20. This may be selected based on a requirement.

S400: The mobile phone 100 generates a three-dimensional image based on the primary camera image and the wide-angle image.

The primary camera image shot by the primary camera 1931 usually has a high resolution. Therefore, when image composition is performed, the primary camera image may be used as a primary image and as a start field of view. The wide-angle image shot by the wide-angle camera 1932 may be used as an auxiliary image, to supplement a peripheral field of view. This implements a viewing angle conversion at a large angle.

Figure 4B:
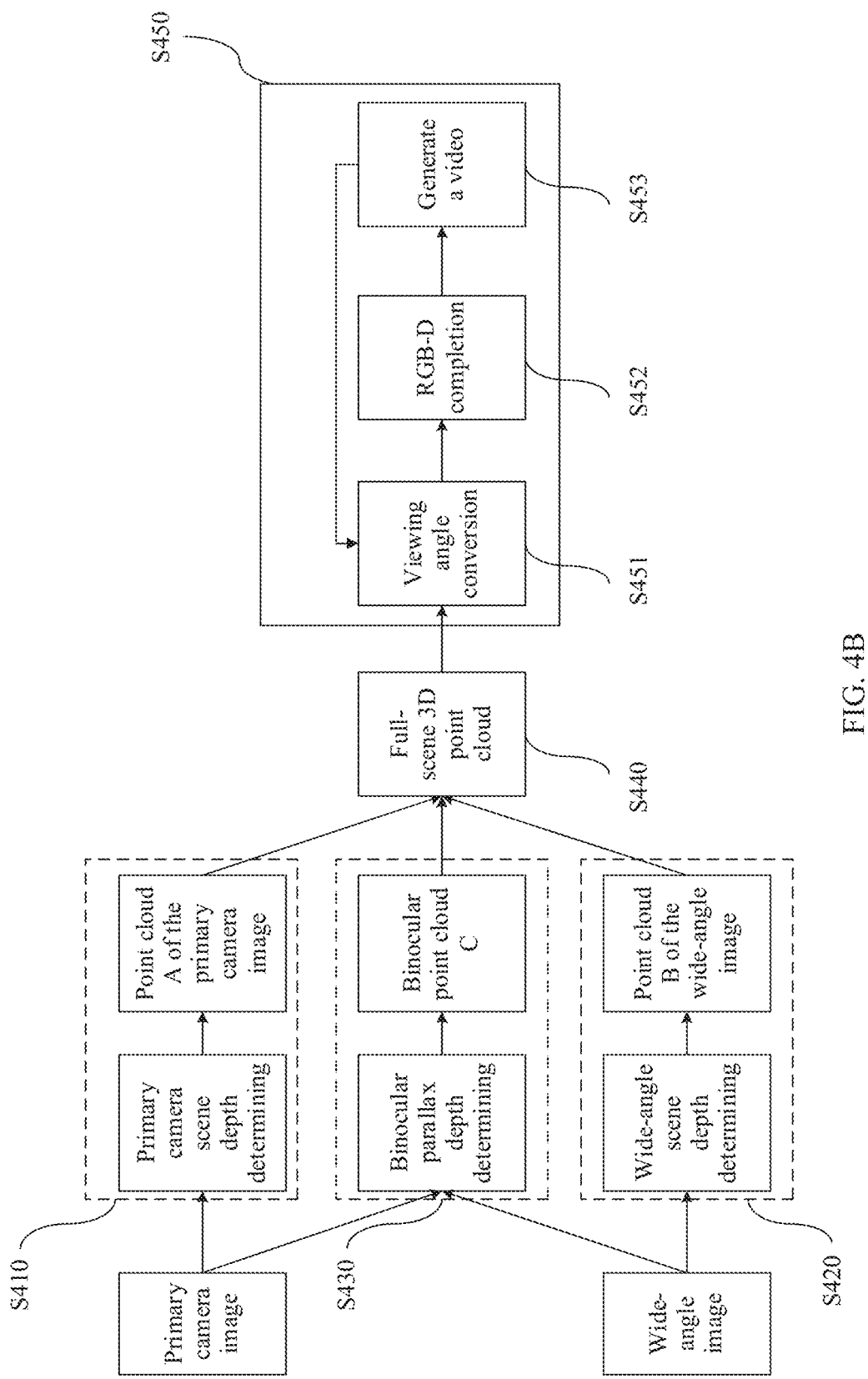

With reference to FIG. 4B, that the mobile phone 100 generates a three-dimensional image based on the primary camera image and the wide-angle image includes:

S410: When performing 3D viewing angle conversion, the mobile phone 100 may perform depth determining (prediction/estimation) of a primary camera scene (the primary camera image) on the primary camera image by using a neural network, to obtain a depth of each pixel in the primary camera image, and generate a point cloud (model) A corresponding to the primary camera image.

That the mobile phone 100 performs depth determining on the primary camera image may be performing depth prediction by inputting the primary camera image into a neural network used to predict a depth of an image. The neural network may be a fully connected network based on a ResNet-50 network structure, or may be another type of network. This may be selected based on a requirement.

That the depth of the primary camera image is determined by using the neural network may be that the depth of each pixel in the primary camera image is determined to obtain the depth of each pixel in the primary camera image, that is, obtain a depth map of the primary camera image.

Then, the mobile phone 100 performs coordinate system conversion on the depth map of the primary camera image to generate a point cloud A of the primary camera image.

For example, converting an image coordinate system to a world coordinate system may be considered as converting a coordinate system of the depth map of the primary camera image by using a transformation formula of intrinsic and extrinsic parameter matrix. A constraint condition for coordinate system conversion is a camera intrinsic parameter (for example, a focal length of the camera). The formula is as follows: where x, y, and z are a world coordinate system, that is, are a point cloud coordinate system, x', and y' are an image coordinate system, D is a depth value, $f_x$ is a camera focal length in an x direction, and $f_y$ is a camera focal length in a y direction.

$$\begin{vmatrix} x \\ y \\ z \end{vmatrix} = D \begin{vmatrix} \frac{1}{f_x} & 0 & 0 \\ 0 & 0 & 0 \\ 0 & \frac{1}{f_y} & 1 \end{vmatrix} \begin{vmatrix} x' \\ y' \\ 1 \end{vmatrix} \quad (1)$$

Before the foregoing conversion is performed, an undistort (image distortion) operation may be performed on x' and y' to reduce a point cloud error.

Therefore, the point cloud A of the primary camera image can be obtained by performing coordinate system conversion on each pixel of the primary camera image.

S420: Perform wide-angle scene depth determining on the wide-angle image by using the neural network, to obtain depths of pixels in the wide-angle image, and generate a point cloud (model) B of the wide-angle image corresponding to the pixels.

A process in which the mobile phone 100 generates the point cloud B of the wide-angle image for the wide-angle image is the same as the foregoing process in which the point cloud A of the primary camera image is generated. Details are not described herein.

S430: Determine a binocular depth map based on the primary camera image and the wide-angle image, and generate a binocular point cloud (model) C corresponding to the binocular depth map.

A common area of the images simultaneously shot by the primary camera 1931 and the wide-angle camera 1932 is calculated based on camera parameters of the primary camera 1931 and the wide-angle camera 1932. According to a stereo vision technology, the binocular depth map is obtained by calculating content in the common area by using a stereo matching imaging algorithm (for example, a three-dimensional block matching algorithm). In addition, a 3D point cloud model is established by using the binocular depth map, and the corresponding binocular point cloud C (model) may be obtained.

S440: Match and fuse the three point clouds, that is, the point cloud A of the primary camera image, the point cloud B of the wide-angle image, and the binocular point cloud C to obtain a fused three-dimensional point cloud model, where the fused three-dimensional point cloud model may be considered as a full-scene 3D point cloud model, that is, the three point clouds are mutually corrected and supplemented, to obtain a depth of an entire scene.

Figure 4C:
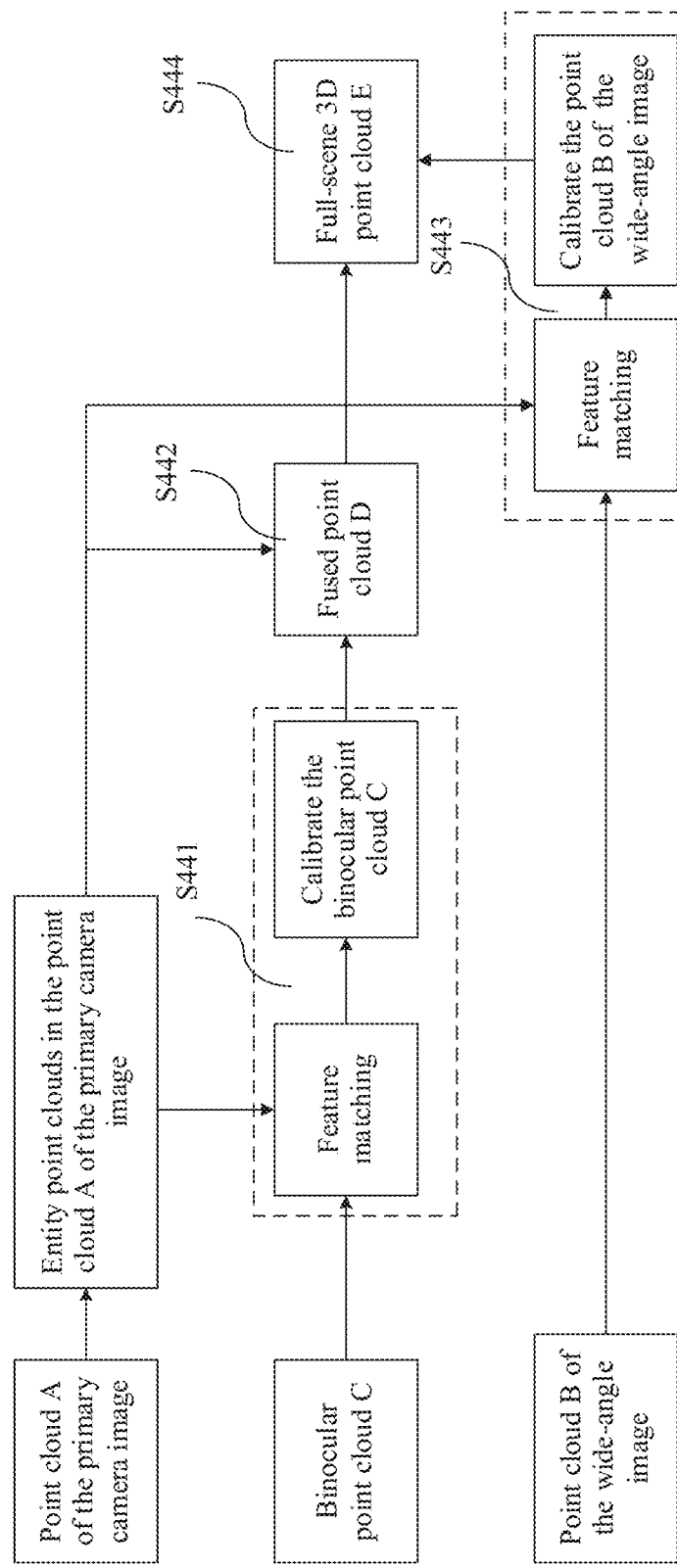

With reference to FIG. 4C, a construction process of the full-scene 3D point cloud includes:

S441: Perform, in the binocular point cloud C, feature matching on each entity point cloud in the point cloud A of the primary camera image, and calibrate the binocular point cloud C.

Through registration in a point cloud system, the point cloud A of the primary camera image (that is, each entity point cloud in the point cloud A of the primary camera image) and the binocular point cloud C are coordinated in a reference system of the point cloud A of the primary camera image, that is, may be considered as coordinated in the world coordinate system.

Because generation manners of the point cloud A of the primary camera image and the binocular point cloud C are different, point clouds of a same actual object are different, and registration (calibration) needs to be performed on the two point clouds. An iterative closest point (Iterative Closest Point, ICP) algorithm may be used to perform, in the binocular point cloud C, feature matching on each entity point cloud in the point cloud A of the primary camera image. Alternatively, by using a semantic segmentation network, for example, a fully connected (convolutional) network (Fully Connected Network, FCN) or a U-Net (U-Net), two or more same objects are obtained in the point cloud A of the primary camera image and the binocular point cloud C. Then, a difference in depths of a same object in different point clouds is calculated to obtain a size difference. Finally, depth scaling is performed based on the size difference to obtain a point cloud in a same scale and perform fusion registration.

S442: Fill the point cloud A of the primary camera image with the binocular point cloud C to form a fused point cloud D.

After registration, a union set of the point cloud A of the primary camera image and the binocular point cloud C is obtained as the fused point cloud D.

S443: Perform, in the point cloud B of the wide-angle image, feature matching on each entity point cloud in the point cloud A of the primary camera image, and calibrate the point cloud B of the wide-angle image.

Through registration in the point cloud system, the point cloud A of the primary camera image and the point cloud B of the wide-angle image are coordinated in the reference system of the point cloud A of the primary camera image, that is, may be considered as coordinated in the world coordinate system.

To perform registration (calibration) on the two point clouds, that is, the point cloud A of the primary camera image and the point cloud B of the wide-angle image, feature matching may be performed, in the point cloud B of the wide-angle image, on each entity point cloud of the point cloud A of the primary camera image by using the ICP algorithm. Alternatively, two or more same objects are obtained in the point cloud A and the point cloud B of the wide-angle image by using the semantic segmentation network. Then, a difference in depths of a same object in different point clouds is calculated to obtain a size difference. Finally, depth scaling is performed based on the size difference to obtain a point cloud in a same scale and perform fusion registration.

S444: Generate a full-scene 3D point cloud E.

The final complete full-scene 3D point cloud E is generated by performing registration and fusion (for example, taking a union set of the point clouds) based on a location of each point in the fused point cloud D and the point cloud B of the wide-angle image that is obtained after depth prediction.

It should be noted that, each point in the full-scene 3D point cloud E includes coordinate system location information of the point, and an RGB color feature and a texture feature that correspond to the point, which are used for subsequent rendering and forming of the three-dimensional image.

In this application, the point cloud B of the wide-angle image and the binocular point cloud C are calibrated by using the point cloud A of the primary camera image, and the three point clouds, that is, the point cloud A of the primary camera image, the point cloud B of the wide-angle image, and the binocular point cloud C are coordinated in a same coordinate system to form the fused full-scene 3D point cloud. A fusion process may be shown in S441-S444.

In addition, in the fusion process, the point cloud A of the primary camera image and the point cloud B of the wide-angle image may be fused first, and then the binocular point cloud C is fused, or the point cloud B of the wide-angle image and the binocular point cloud C are fused first, and then the point cloud A of the primary camera image is fused. In addition, before the point cloud B of the wide-angle image and the binocular point cloud C are fused, the point cloud B of the wide-angle image and the binocular point cloud C may be first calibrated by using the point cloud A of the primary camera image.

In addition, the point cloud A of the primary camera image, the point cloud B of the wide-angle image, and the binocular point cloud C may be coordinated in another coordinate system other than the world coordinate system.

With reference to FIG. 4B, after the full-scene 3D point cloud is constructed, the method further includes:

S450: Perform 3D viewing angle conversion and generate a new viewing angle image until a three-dimensional image is generated, that is, generate a viewing angle converted video.

An imaginary camera (a viewing angle) may be placed in the 3D point cloud model, and rendering at a plurality of viewing angles is performed by simulating rotation of the camera, so that a point cloud model at a corresponding viewing angle can be obtained. In addition, inference prediction and completion are performed on elements such as a color and a depth of a part that is not photographed in the original primary camera image and wide-angle image, so that an image at the corresponding viewing angle can be obtained. By processing continuous viewing angles, a three-dimensional image after 3D viewing angle conversion may be formed, to support movement and conversion effects at a 3D viewing angle.

Still refer to FIG. 4B. Generating a viewing angle converted video includes:

S451: Perform viewing angle conversion.

Based on an original viewing angle of the primary camera image, a next viewing angle location is selected. The next viewing angle location may be translated in x, y, and z directions, or may be rotated at an original location to obtain new angles such as a pitch angle, a roll angle, and a yaw angle.

S452: Complement an RGB-D image (Depth Map, depth map).

A point cloud at the new viewing angle, and an RGB color feature and a texture feature that are corresponding to each point are obtained, and rendering is performed based on the RGB color feature and the texture feature that are of each point at the new viewing angle, and completion is performed on a texture, a depth, a color, and the like of a shielded part at the new viewing angle, to obtain an image at the new viewing angle.

Figure 4D:
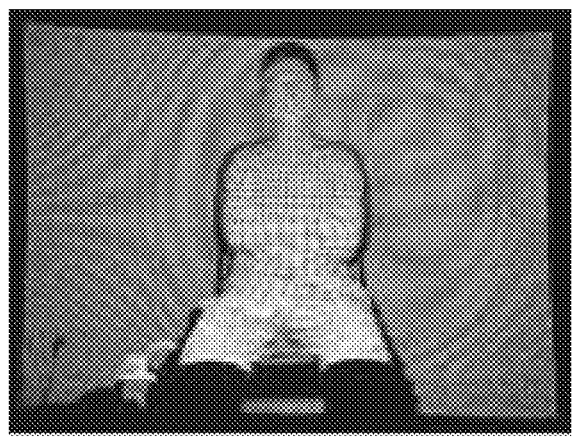
FIG. 4D is a schematic diagram of a primary camera image shot by using a photographing method provided in this application according to some implementations of this application.
Figure 4E:
FIG. 4E is a schematic diagram of a part on which point cloud supplement that needs to be performed when 3D viewing angle conversion is performed by using a photographing method provided in this application according to some implementations of this application.

The point cloud A of the primary camera image may be shown in FIG. 4D. After viewing angle conversion, a point cloud that needs to be supplemented on a side surface may be the part shown in a in FIG. 4E. After viewing angle conversion, there is a shielded angle in the original image of FIG. 4D and a place that cannot be photographed in a field of view (FOV) of the primary camera 1931. Therefore, point cloud prediction and corresponding RGB prediction need to be performed at a shielded location of the original image. Because the two images, that is, the primary camera image and the wide-angle image having a parallax are used to perform point cloud composition, a point cloud deficiency at the new viewing angle can be complemented to some extent. In addition, an RGB part that is beyond the field of view of the primary camera 1931 is filled with a texture of the wide-angle image, to reduce a quantity of points that need to be predicted and increase accuracy obtained after viewing angle rotation. Finally, a point cloud of an object that cannot be obtained at the original viewing angle but needs to be presented at the new viewing angle can be complemented by using a point cloud repair algorithm (for example, a Markov random field method) or a network model (for example, a generative adversarial network model and a U-type network model).

S453: Generate a video.

Steps S451 and S452 are repeatedly performed. Therefore, a plurality of frames of images are iteratively generated, and a three-dimensional image is generated based on the plurality of frames of images.

After the three-dimensional image is generated, the three-dimensional image may be stored in a format such as a moving picture experts group (Moving Picture Experts Group) MPEG format, a WMV (Windows Media Video) format, an FLV (Flash Video) format, or an MOV format.

Further, after the three-dimensional image is generated, the method may further include:

S500: The mobile phone 100 displays the three-dimensional image (video).

Figure 5F:
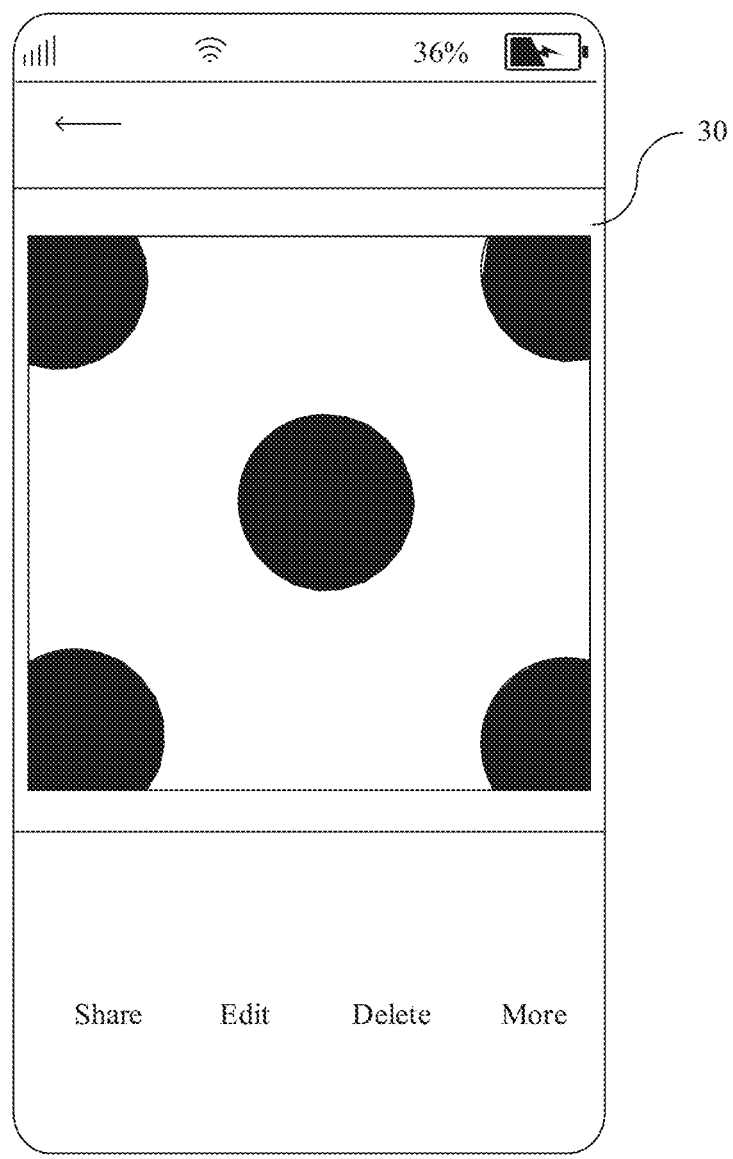

As shown in FIG. 5F, a manner of displaying the three-dimensional image on the photo display interface 30 may be as follows: The primary camera image is first displayed, the wide-angle image is hidden from the user, and then the mobile phone 100 automatically plays the three-dimensional image that exists in a video form, and presents an image at another viewing angle.

A manner of presenting the video by the mobile phone 100 may be successively switching from the viewing angle of the primary camera image to a next viewing angle. For example, the video may be successively presented at viewing angles in left-lower-right-upper directions, or may be successively presented at viewing angles in left-upper-right-lower directions. This may be set based on a requirement. After playback is completed, it is restored to display the primary camera image.

Figure 5G:
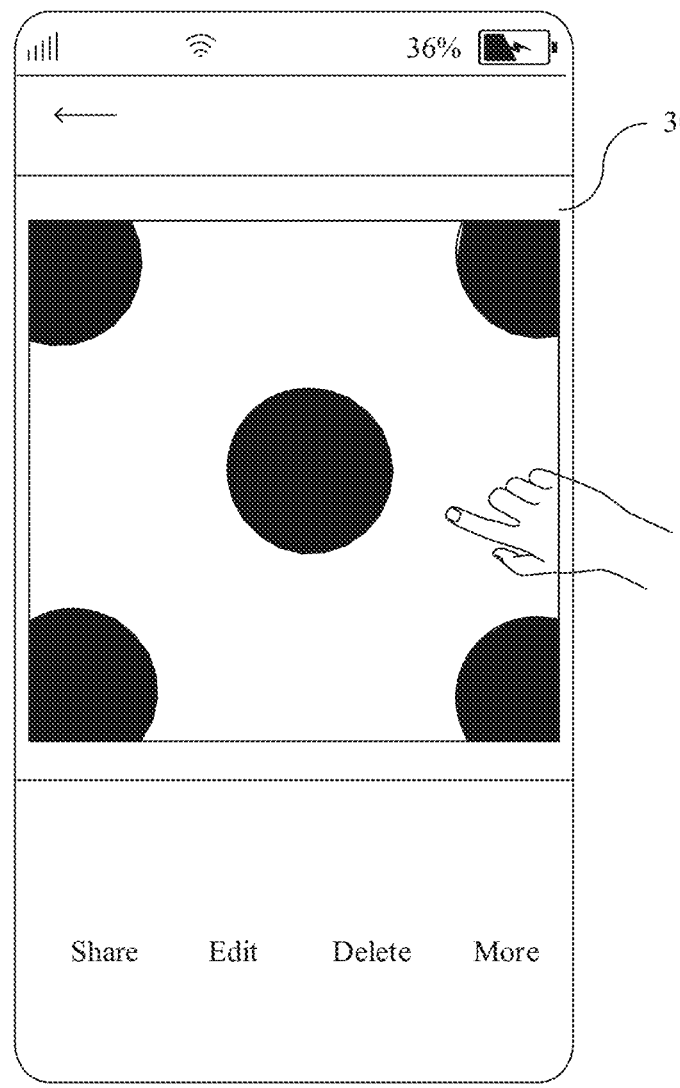
Figure 5H:
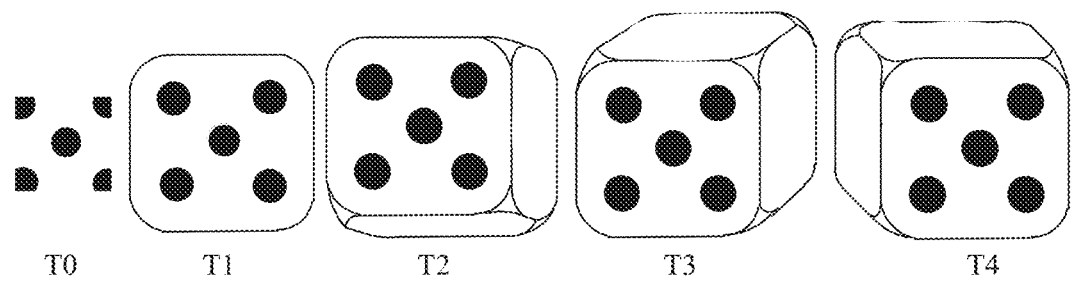

For example, with reference to FIG. 5F, FIG. 5G, and FIG. 5H, that the mobile phone 100 automatically plays the three-dimensional image that exists in a video form may be as follows: On the photo display interface 30 shown in FIG. 5F, the mobile phone 100 uses the primary camera image as a primary display image TO. Then, if the mobile phone 100 detects a tap operation shown in FIG. 5G (for example, a double-tap operation) that is performed by the user on the primary display image T0, as shown in FIG. 5H, the mobile phone 100 displays, at a first time point T1, an image T1 corresponding to a first viewing angle: displays, at a second time point, an image T2 corresponding to a second viewing angle; displays, at a third time point, an image T3 corresponding to a third viewing angle; and displays, at a fourth time point, an image T4 corresponding to a fourth viewing angle. Then, the mobile phone 100 displays the primary display image T0 at a fifth time point, that is, the mobile phone displays a display interface shown in FIG. 5F or FIG. 5G, to finish playing the video and stop playing the video.

Certainly, after the primary display image TO, the image T1 may not be displayed, and the image T2, the image T3, and the image T4 are directly successively displayed.

It should be noted that in this application, the mobile phone 100 obtains the image T2, the image T3, and the image T4. The imaginary camera (viewing angle) may be placed in the 3D point cloud model, and rendering at a plurality of viewing angles is performed by simulating rotation of the camera, so that a point cloud model at a corresponding viewing angle can be obtained. In addition, inference prediction and completion are performed on elements such as a color and a depth of a part that is not photographed in the original primary camera image and wide-angle image, so that an image at the corresponding viewing angle can be obtained.

In addition, the manner of displaying the three-dimensional image on the photo display interface 30 may be further as follows: The primary camera image is first displayed, and the wide-angle image is hidden from the user. If the mobile phone 100 detects a triggering operation performed by the user on a play button (which may be set based on a requirement) of the three-dimensional image, the mobile phone 100 automatically plays the three-dimensional image that exists in a video form.

Displaying the three-dimensional image by the mobile phone 100 on the photo display interface 30 may be directly displaying the three-dimensional image after photographing is completed, or may be displaying the three-dimensional image based on an operation performed by the user to open a photo.

In another implementation of this application, after the mobile phone 100 displays the three-dimensional image (the primary camera image) on the photo display interface 30, the mobile phone 100 presents an image at a corresponding viewing angle if detecting a viewing angle conversion operation performed by the user on the photo.

Figure 6A:
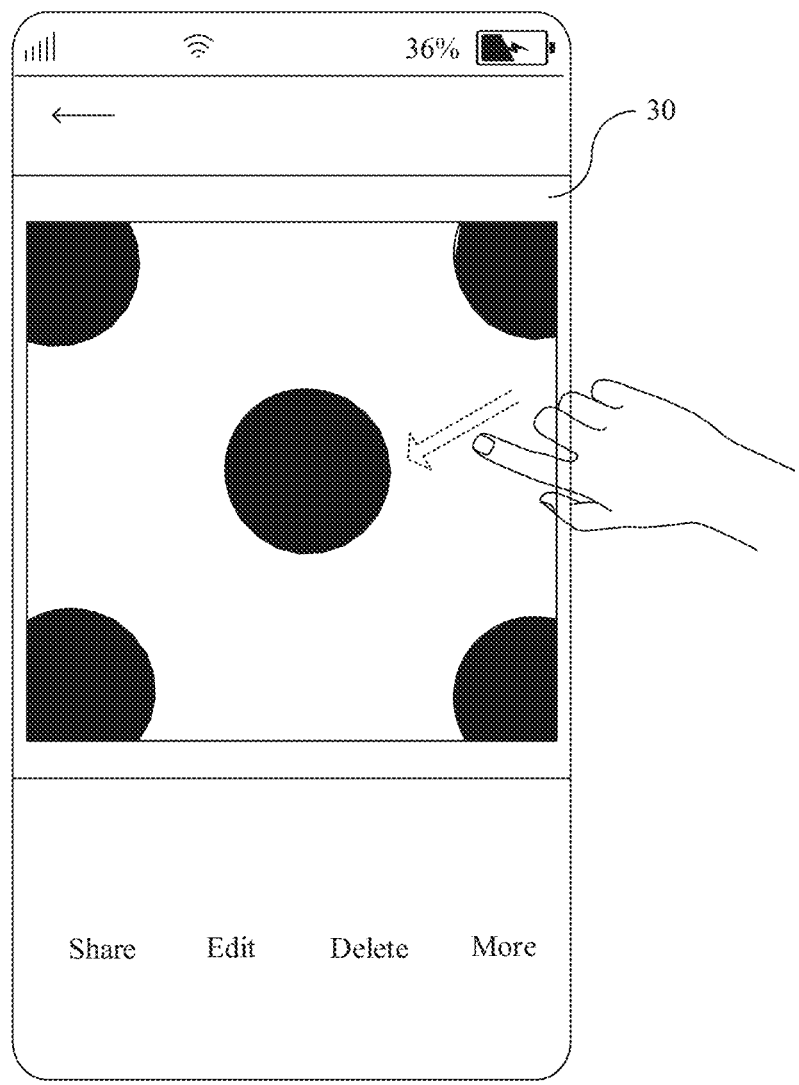
FIG. 6A to FIG. 6F are schematic diagrams of some other display interfaces of a mobile phone 100 according to some implementations of this application.
Figure 6B:
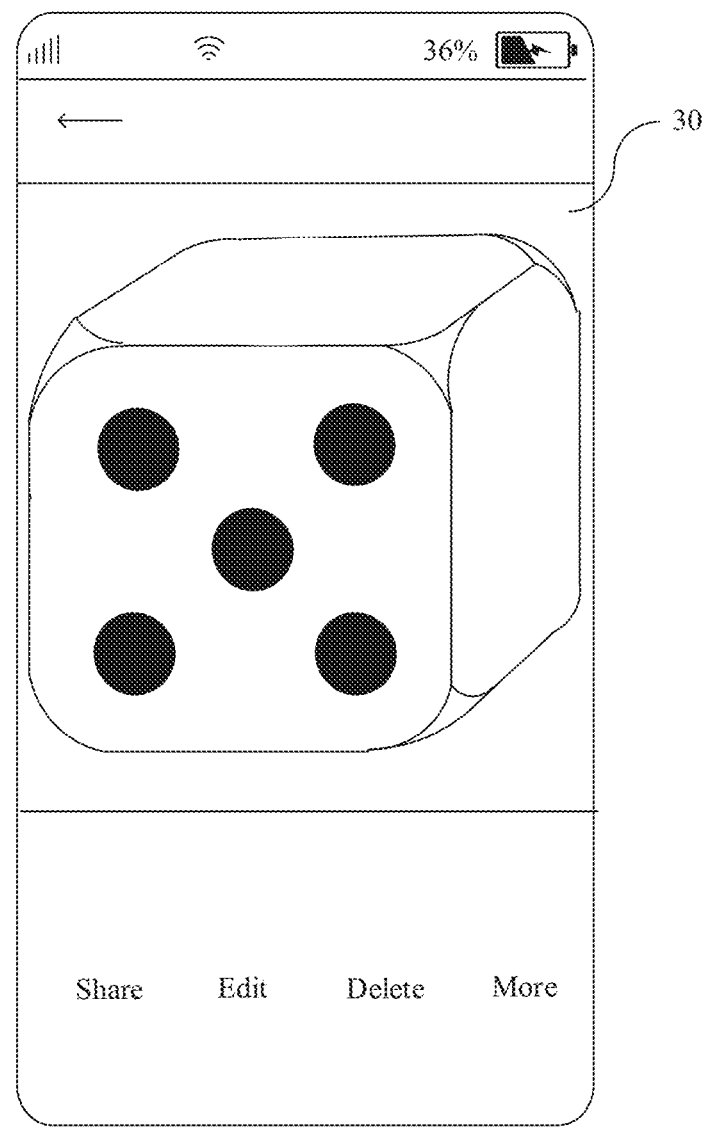

For example, as shown in FIG. 6A, if the user slides the three-dimensional image to the lower left, a display picture of the mobile phone 100 may be shown in FIG. 6B (which may be considered as presenting an image corresponding to a right top viewing angle of the user).

Figure 6C:
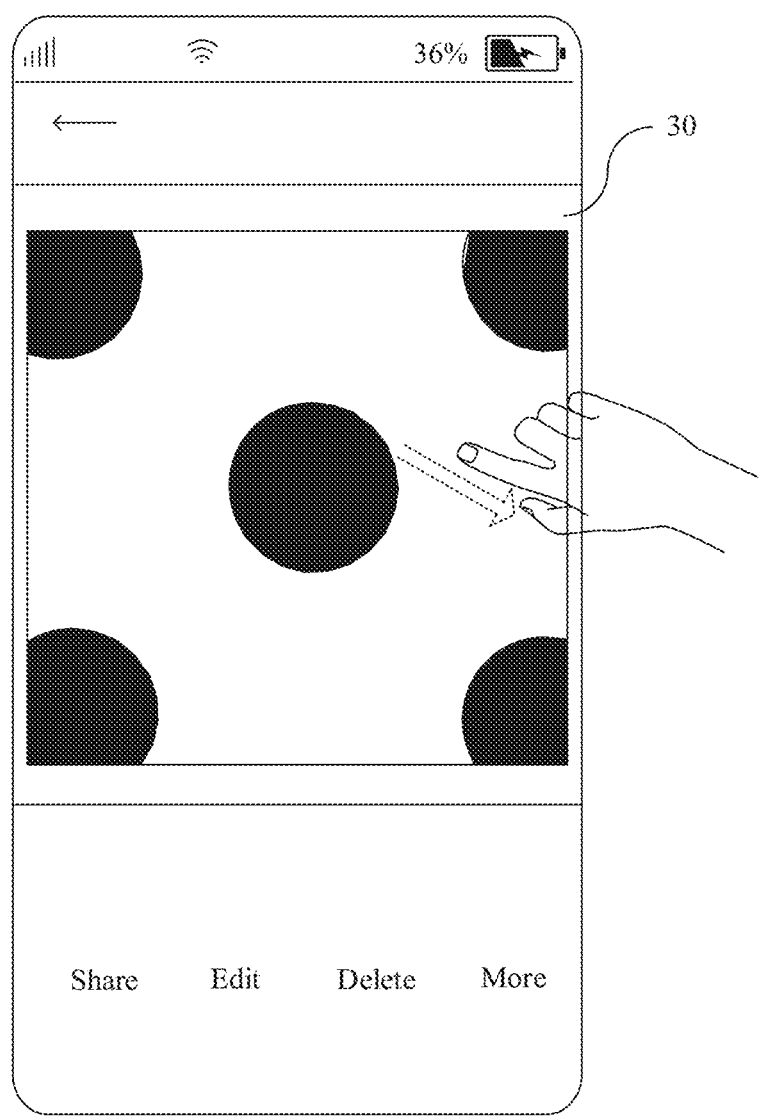
Figure 6D:
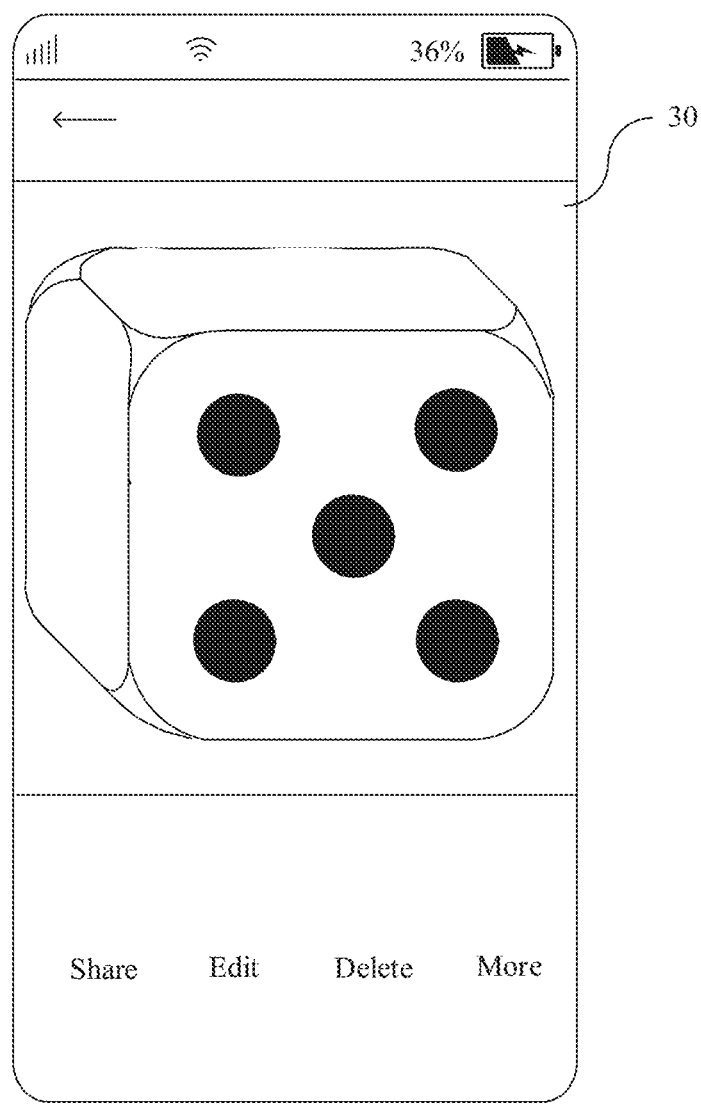

As shown in FIG. 6C, if the user slides the photo to the lower right, a display picture of the mobile phone 100 may be shown in FIG. 6D (which may be considered as presenting an image corresponding to a left top viewing angle of the user).

Figure 6E:
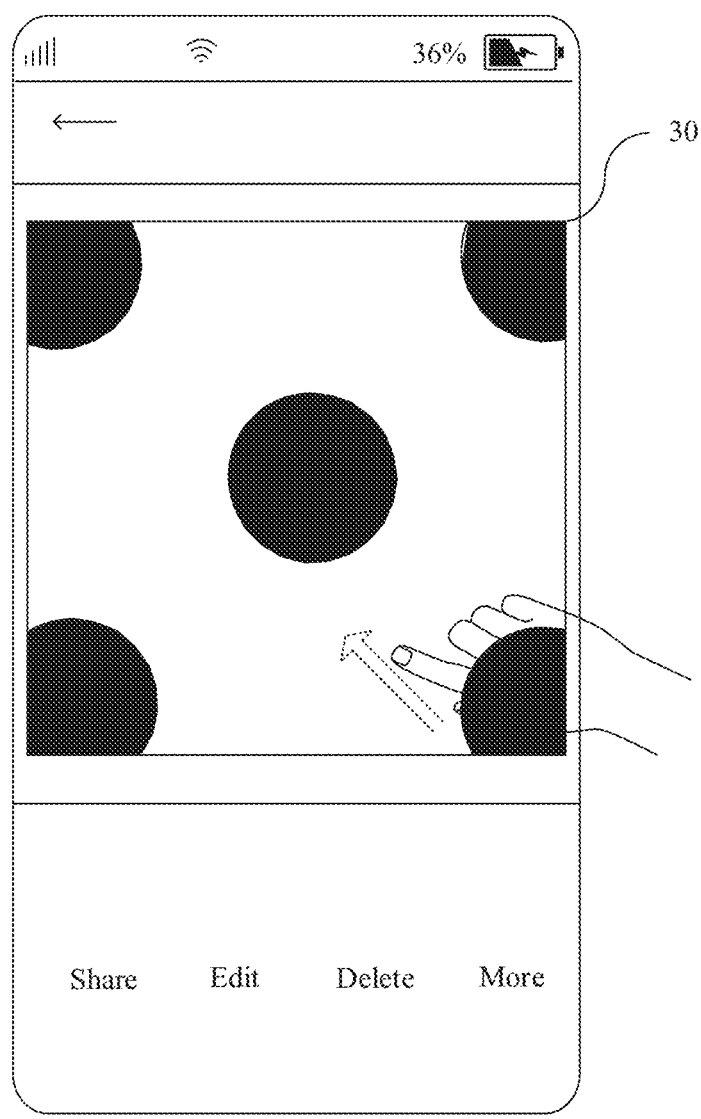
Figure 6F:
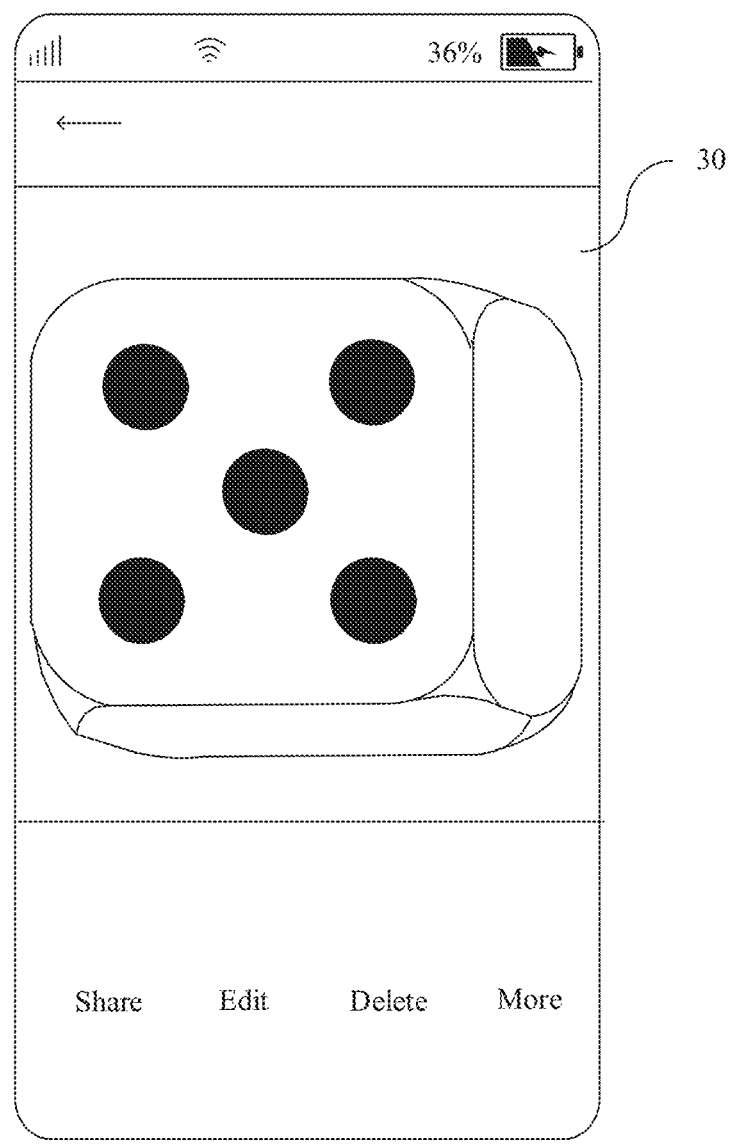

As shown in FIG. 6E, if the user slides the photo to the upper left, a display picture of the mobile phone 100 may be shown in FIG. 6F (which may be considered as presenting an image corresponding to a right upward viewing angle of the user).

In addition, the photo may be further slid in any other direction on an interface shown in FIG. 6B or FIG. 6D, to view the image in a larger field of view.

Certainly, the three-dimensional image may also be slid upward, or the photo may be slid downward, or the photo may be slid m any other direction to view the image in a larger field of view.

Further, a dashed-line arrow displayed on the photo display interface 30 is a guide identifier of the viewing angle conversion operation. The guide identifier of the viewing angle conversion operation may be displayed together with the primary camera image when the primary camera image is displayed, or may be displayed based on the viewing angle conversion operation performed by the user. This may be selected based on a requirement.

The photographing method provided in this implementation is a binocular photographing method in which the wide-angle camera 1932 is used as an auxiliary camera. According to the method, not only the binocular image of the wide-angle image and the primary camera image is obtained, but also the wide-angle image (which is hidden and invisible to the user) is stored. In comparison with the solution in the conventional technology, the primary camera image shot by the primary camera 1931 is used as a start viewing angle, and rotation and a change of the viewing angle can be extended to a scene that cannot be photographed by the primary camera 1931 but that exists in the wide-angle image shot by the wide-angle camera 1932. This increases a rotation range of the viewing angle, improves user experience, and increases the field of view of the entire scene.

In addition, through depth prediction, the point clouds of the primary camera image and the wide-angle image and the binocular point cloud are separately obtained, and the three types of point clouds are fused. In comparison with the solution in the conventional technology, based on fusion of the three types of point clouds, 3D model reconstruction with a wider field of view is implemented, and a density of point clouds in an overlapping area of the field of view is increased, thereby improving an effect obtained after conversion.

According to the photographing method provided in this implementation, 2D photos shot by the primary camera 1931 and the wide-angle camera 1932 can be converted into a three-dimensional image. In addition, a three-dimensional point cloud is reconstructed, to improve accuracy of the 3D point cloud and improve user experience of 3D viewing angle conversion. In addition, the high-resolution primary camera is used as the start field of view, and information that does not exist in the primary camera image but is recorded in the wide angle image can appear in a converted image, thereby improving user experience.

3D viewing angle conversion of the 2D image can be implemented based on single photographing performed by the user. To be specific, the user needs to perform a photographing operation only once, and the mobile phone 100 simultaneously invokes two cameras, that is, the primary camera 1931 and the wide-angle camera 1932 to obtain two images. The primary camera image is used as a primary image, and the wide-angle image is used as an auxiliary image, thereby implementing 3D viewing angle conversion based on a single image.

Accuracy of 3D viewing angle conversion can be improved by using the wide-angle image, the point cloud generated based on depth prediction of the wide-angle image, and the binocular point cloud generated by binocular matching. A point cloud together generated based on depth prediction of the primary camera image, depth prediction of the wide-angle image, and binocular matching is used to improve density and accuracy of the point cloud, reduce a quantity of points that need to be filled after viewing angle conversion, and improve accuracy obtained after 3D viewing angle conversion.

A changing range of the viewing angle of the primary camera image in the 2D image is increased by using the wide-angle image, thereby improving user experience. In 3D viewing angle conversion implemented by using a single 2D image, a rotation range is limited, and content presented at a new viewing angle after rotation cannot exceed a field of view of the original 2D image. With assistance from the wide-angle image, the rotation range of the viewing angle is increased, so that an object that is not presented in the 2D image before rotation of the viewing angle is accurately presented.

This application further provides an image processing method, and the image processing method may be applied to the foregoing electronic device.

In an implementation of this application, the image processing method includes: The electronic device obtains a first image and a second image, and generates a three-dimensional image based on the first image and the second image, where the first image includes first content, and the second image includes the first content of the first image and includes second content other than the first content of the first image. That is, the second image may be considered as an image whose viewing angle range is greater than a viewing angle range of the first image.

The electronic device may shoot the first image and the second image. For example, the electronic device may be the foregoing mobile phone 100, the first image may be the foregoing primary camera image, and the second image may be the foregoing wide-angle image.

Certainly, the electronic device may alternatively be another device, and the first image and the second image may alternatively be images in another scenario.

In addition, that the electronic device obtains the first image and the second image may alternatively be that the electronic device obtains the first image and the second image from storage locations or storage devices of the first image and the second image. For example, the computer obtains two photos from the Internet respectively as the first image and the second image. This may be selected based on a requirement.

In an implementation of this application, after the three-dimensional image is generated, the image processing method further includes: directly displaying three-dimensional images corresponding to different viewing angles.

In an implementation of this application, after the three-dimensional image is generated, the image processing method further includes: receiving a viewing angle conversion operation performed by a user on the three-dimensional image, and displaying a three-dimensional image at a viewing angle corresponding to the viewing angle conversion operation.

A process in which the electronic device generates the three-dimensional image based on the first image and the second image may be as follows: The electronic device obtains a point cloud of the first image based on the first image, obtains a point cloud of the second image based on the second image, determines a common area image based on the first image and the second image, and obtains a point cloud of a common area based on the common area image; obtains a fused three-dimensional point cloud based on the point cloud of the first image, the point cloud of the second image, and the point cloud of the common area; and obtains the three-dimensional image based on the fused three-dimensional point cloud.

Obtaining the point cloud of the image includes obtaining a pixel depth of each pixel in the image through depth prediction by a neural network; and obtaining the point cloud based on the pixel depth.

Obtaining the fused three-dimensional point cloud based on the point cloud of the first image, the point cloud of the second image, and the point cloud of the common area includes, performing depth calibration on the point cloud of the second image and the point cloud of the common area based on the point cloud of the first image; and fusing the point cloud of the first image with a calibrated point cloud of the second image and a calibrated point cloud of the common area, to obtain the fused three-dimensional point cloud.

The fusing the point cloud of the first image with a calibrated point cloud of the second image and a calibrated point cloud of the common area includes: unifying the calibrated point cloud of the second image, the calibrated point cloud of the common area, and the point cloud of the first image in a same coordinate system. The same coordinate system may be a world coordinate system.

Obtaining the three-dimensional image based on the fused three-dimensional point cloud includes: determining a first conversion viewing angle; obtaining a first point cloud corresponding to the first conversion viewing angle, and performing image rendering and supplement based on the first point cloud to form a first two-dimensional image corresponding to the first conversion viewing angle; switching different conversion viewing angles, and generating two-dimensional images at corresponding viewing angles; and forming the three-dimensional image by using a plurality of frames of two-dimensional images corresponding to different viewing angles.

In this application, a generation process of the common area image may be the same as or similar to the foregoing generation process of the binocular image. In addition, a generation process of the three-dimensional image is the same as or similar to steps S300-S500, and display of the three-dimensional image is also the same as or similar to the foregoing display. Details are not described herein.

According to the image processing method provided in this application, the three-dimensional image is generated by using the first image and the second image whose viewing angle range is greater than that of the first image. This can increase a rotation range of a viewing angle of the three-dimensional image, improve user experience, and increase a field of view of the entire scene.

This application further provides a photographing method, applied to a system including a mobile phone and a server. According to the photographing method, the mobile phone shoots the foregoing primary camera image and the foregoing wide-angle image, and then sends the primary camera image and the wide-angle image to the server. The server generates the three-dimensional image based on the primary camera image and the wide-angle image, and then the server sends the three-dimensional image to the mobile phone. The mobile phone can display the three-dimensional image in the foregoing manner. According to the photographing method, a process in which the server generates the three-dimensional image may be the same as the foregoing process in which the mobile phone 100 generates the three-dimensional image. Details are not described herein.

This application further provides an image processing method, applied to a system including an electronic device and a server. According to the image processing method, the electronic device shoots the foregoing first image and the foregoing second image, and then sends the first image and the second image to the server. The server generates the three-dimensional image based on the first image and the second image, and then the server sends the three-dimensional image to the electronic device. The electronic device can display the three-dimensional image in the foregoing manner. According to the image processing method, a process in which the server generates the three-dimensional image may be the same as the foregoing process in which the electronic device generates the three-dimensional image. Details are not described herein.

In this application, the server may be a cloud server or another type of server.

In addition, the server may alternatively be another electronic device (for example, another mobile phone, a computer, or a television) other than the mobile phone (or the electronic device). After generating the three-dimensional image, the another electronic device sends the three-dimensional image to the mobile phone (or the electronic device).

Figure 7:
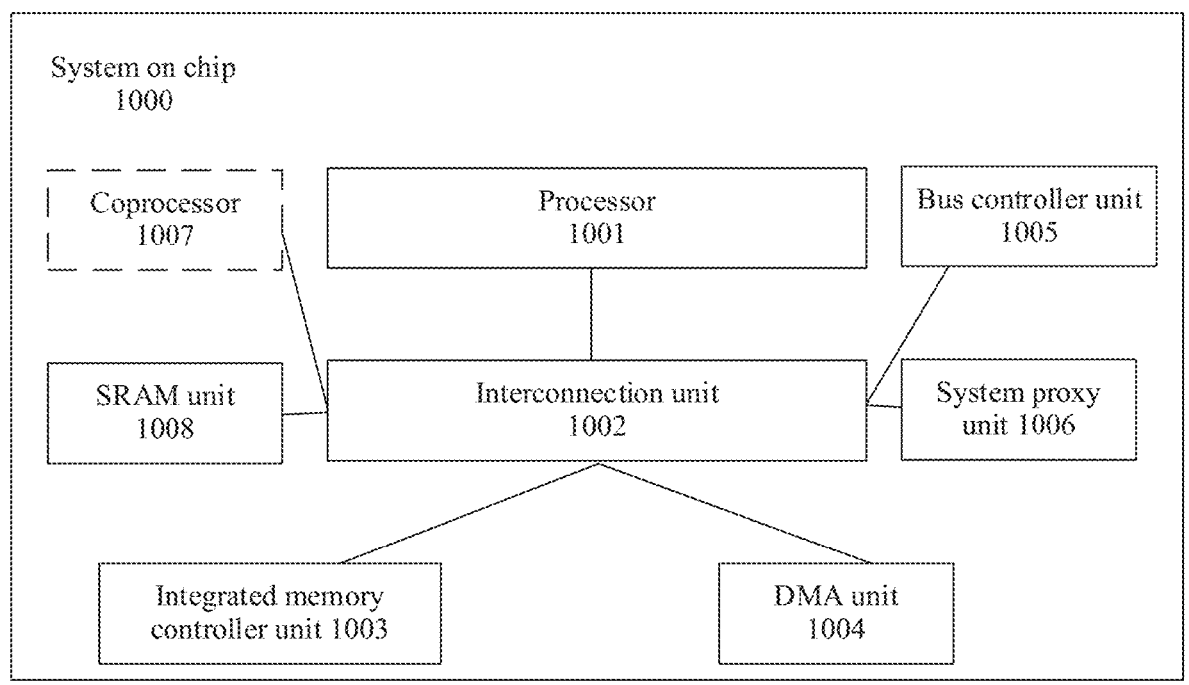
FIG. 7 is a schematic diagram of a structure of a system on chip (SoC) according to some embodiments of this application.

FIG. 7 is a schematic diagram of a structure of a SoC (System on Chip, system on chip) 1000 according to an implementation of this application. In FIG. 7, similar components have same reference numerals. In addition, a dashed box is an optional feature of a more advanced SoC 1000. The SoC 1000 may be applied to any electronic device according to this application, for example, the electronic device according to any embodiment of this application. Corresponding functions can be implemented based on different devices in which the SoC 1000 is located and different instructions stored in the SoC 1000.

In FIG. 7, the SoC 1000 includes an interconnection unit 1002, which is coupled to a processor 1001; a system proxy unit 1006; a bus controller unit 1005; an integrated memory controller unit 1003; a group of or one or more coprocessors 1007, which may include integrated graphics logic, a graphics processing unit, an audio processor, and a video processor; an SRAM (static random access memory) unit 1008; and a DMA (direct memory access) unit 1004. In an embodiment, the coprocessor 1007 includes a dedicated processor, for example, a network or communication processor, a compression engine, a GPGPU, a high throughput MIC processor, or an embedded processor.

The SRAM unit 1008 may include one or more computer-readable media configured to store data and/or instructions. The computer-readable storage medium may store instructions. Specifically, temporary and permanent copies of these instructions are stored. These instructions may include: When the instructions are executed by at least one unit in the processor, the electronic device implements the foregoing photographing method or the foregoing image processing method.

All embodiments of the mechanisms disclosed in this application may be implemented in manners such as software, hardware, firmware, or a combination of these implementation methods. The embodiments of this application may be implemented as a computer program or program code executed on a programmable system. The programmable program includes at least one processor and a memory (or a storage system, including a volatile memory and a non-volatile memory and/or a storage unit).

The program code may be applied to input instructions to perform the functions described in the text and generate output information. The output information may be applied to one or more output devices in a known manner. It may be understood that, in this embodiment of this application, a processing system may be a microprocessor, a digital signal processor (DSP), a microcontroller, an application-specific integrated circuit (ASIC), or the like, and/or any combination thereof. According to another aspect, the processor may be a single-core processor, a multi-core processor, or the like, and/or any combination thereof.

The program code may be implemented in an advanced programming language or an object-oriented programming language to communicate with the processor. The program code may also be implemented in an assembly language or a machine language when needed. Actually, the mechanisms described in the text are not limited to any particular programming language. In either case, the language may be a compiled language or an interpreted language.

In some cases, the disclosed embodiments may be implemented by hardware, firmware, software, or any other combination. The disclosed embodiments may be implemented as instructions carried or stored on one or more temporary or non-temporary machine-readable (for example, computer-readable) storage media, and the instructions may be read and executed by one or more processors. For example, the instructions may be distributed by using a network or a barometric computer-readable medium. Thus, the machine-readable medium may include any mechanism for storing or transmitting information in a machine (for example, a computer) readable form, including, but not limited to, a floppy disk, an optical disc, an optical disk, a read-only memory (CD-ROMs), a magneto-optical disk, a read-only memory (ROM), a random access memory (RAM), an erasable programmable read-only memory (EPROM), an electrically erasable programmable read-only memory (EEPROM), a magnetic card or an optical card, and a flash card, or a tangible machine-readable memory configured to transmit information (for example, a carrier and an infrared digital signal) by using a propagating signal in an electrical form, an optical form, an acoustic form, or another form through the Internet. Thus, the machine-readable medium includes any type of machine-readable medium suitable for storing or transmitting electronic instructions or information in a machine readable form.

One or more aspects of at least one embodiment may be implemented by representative instructions stored in the computer-readable storage medium, and the instructions represent various logic in the processor. When the instructions are read by the machine, the mechanism is enabled to function to execute the logic of the technology described in the text. These representations referred to as "IP cores" may be stored on the tangible computer-readable storage medium and provided to a plurality of customers or production devices for implementation to load into a manufacturing machine that actually manufactures the logic or the processor.

In some cases, an instruction converter may be configured to transfer instructions from a source instruction set to a target instruction set. For example, the instruction converter may convert (for example, using static binary transformation, including dynamically compiled dynamic binary transformation), transform, emulate, or otherwise convert the instructions to one or more other instructions processed by a core. The instruction converter may be implemented by software, hardware, firmware, or other combinations. The instruction converter may be on a processor, outside a processor, or partly on a processor, and partly outside a processor.

It should be noted that, terms such as "first" and "second" are used only for distinguishing between descriptions and cannot be understood to indicate or imply relative importance.

It should be noted that in the accompanying drawings, some structural or method features may be shown in a specific arrangement and/or sequence. However, it should be understood that the specific arrangement and/or sorting may not be necessary. Rather, in some embodiments, these features may be arranged in a manner and/or sequence different from that shown in the illustrative drawings. In addition, structural or method features included in a particular drawing do not imply that such features are required in all embodiments, and in some embodiments, these features may not be included or may be combined with other features.

Although this application has been illustrated and described with reference to some preferred implementations of this application, a person of ordinary skill in the art should understand that the foregoing content is further described in detail with reference to a specific implementation of this application, and a specific implementation of this application cannot be construed as a limitation to these descriptions. A person skilled in the art may make various changes in form and detail, including making several simple derivations or substitutions without departing from the spirit and scope of this application.

What is claimed is:

1. A photographing method comprising:
    receiving a photographing instruction of a user;
    shooting, in response to receiving the photographing instruction, a primary camera image using a primary camera of an electronic device;
    shooting, in response to receiving the photographing instruction, a wide-angle image using a wide-angle camera of the electronic device;
    obtaining a first point cloud based on the primary camera image;
    obtaining a second point cloud based on the wide-angle image;
    calculating a common area of the primary camera image and the wide-angle image based on camera parameters of the primary camera and the wide-angle camera;
    calculating, using a stereo matching imaging algorithm, content in the common area to obtain a binocular depth map;
    obtaining, using the binocular depth map, a binocular point cloud based on the primary camera image and the wide-angle image;
    performing a first depth calibration on the second point cloud based on the first point cloud to obtain a first calibrated point cloud of the wide-angle image;
    performing a second depth calibration on the binocular point cloud based on the first point cloud to obtain a second calibrated binocular point cloud;
    obtaining a fused three-dimensional (3D) point cloud bycloud by:
        matching and fusing the first point cloud, the second point cloud, and the binocular point cloud based on a full-scene 3D point cloud; and
        fusing the first point cloud with the first calibrated point cloud and the second calibrated binocular point cloud; and
    generating a 3D image based on the fused 3D point cloud.

2. The photographing method of claim 1, wherein after generating the 3D image, the photographing method further comprises displaying 3D images at different viewing angles.

3. The photographing method of claim 1, wherein after generating the 3D image, the photographing method further comprises:
    receiving a viewing angle conversion operation from the user on the 3D image; and
    displaying a second 3D image at a first viewing angle corresponding to the viewing angle conversion operation.

4. The photographing method of claim 1, further comprising:
    obtaining a pixel depth of each pixel in the primary camera image and the wide-angle image through depth prediction by a neural network; and
    obtaining the binocular point cloud based on the pixel depth.

5. The photographing method of claim 1, wherein fusing the first point cloud with the first calibrated point cloud and the second calibrated binocular point cloud comprises unifying the first calibrated point cloud, the second calibrated binocular point cloud, and the first point cloud in a same coordinate system through a camera parameter conversion.

6. The photographing method of claim 1, further comprising:
    obtaining the full-scene 3D point cloud corresponding to a first conversion viewing angle;
    performing image rendering and supplement based on the full-scene 3D point cloud to form a first two-dimensional (2D) image corresponding to the first conversion viewing angle;
    switching different conversion viewing angles;
    generating 2D images at corresponding viewing angles; and
    further generating the 3D image using a plurality of frames of the 2D images.

7. The photographing method of claim 1, wherein after receiving the photographing instruction, the photographing method further comprises enabling the primary camera and the wide-angle camera.

8. The photographing method of claim 1, wherein before receiving the photographing instruction, the photographing method further comprises:
    receiving an operation of invoking a camera function by the user; and
    displaying a photographing interface.

9. The photographing method of claim 8, wherein the photographing interface comprises a selection control for a camera preview picture, wherein the selection control comprises a first selection control for a first preview picture of the primary camera and a second selection control for a second preview picture of the wide-angle camera, and wherein the photographing method further comprises:
    displaying the first preview picture when detecting a first triggering operation from the user on the first selection control; and
    displaying the second preview picture when detecting a second triggering operation from the user on the second selection control.

10. An image processing method comprising:
    obtaining a first image comprising first content and a second image comprising the first content and second content other than the first content;
    obtaining a first point cloud based on the first image;
    obtaining a second point cloud based on the second image;
    calculating a common area of the first image and the second image based on respective camera parameters of a first camera and a second camera;

calculating, using a stereo matching imaging algorithm, content in the common area to obtain a binocular depth map;

obtaining, using the binocular depth map, a binocular point cloud of the common area based on the first image and the second image;

obtaining a fused three-dimensional (3D) point cloud by matching and fusing the first point cloud, the second point cloud, and the binocular point cloud based on a full-scene 3D point cloud; and generating a first 3D image based on based on the fused 3D point cloud.

11. The image processing method of claim 10, wherein after generating the first 3D image, the image processing method further comprises:
receiving a viewing angle conversion operation from a user on the first 3D image; and
displaying a second 3D image at a first viewing angle corresponding to the viewing angle conversion operation.

12. An electronic device, comprising:
a primary camera;
a wide-angle camera; and
one or more processors coupled to the primary camera and the wide-angle camera and configured to:
receive a photographing instruction of a user;
shoot a primary camera image using the primary camera;
shoot a wide-angle image using the wide-angle camera;
obtain a first point cloud based on the primary camera image;
obtain a second point cloud based on the wide-angle image;
calculate a common area of the primary camera image and the wide-angle image based on camera parameters of the primary camera and the wide-angle camera;
calculate, using a stereo matching imaging algorithm, content in the common area to obtain a binocular depth map;
obtain, using the binocular depth map, a binocular point cloud based on the primary camera image and the wide-angle image;
perform a first depth calibration on the second point cloud based on the first point cloud to obtain a first calibrated point cloud of the wide-angle image;
perform a second depth calibration on the binocular point cloud based on the first point cloud to obtain a second calibrated binocular point cloud;
obtain a fused three-dimensional (3D) point cloud bycloud by:
matching and fusing the first point cloud, the second point cloud, and the binocular point cloud based on a full-scene 3D point cloud; and
fusing the first point cloud with the first calibrated point cloud and the second calibrated binocular point cloud; and
generate a 3D image based on the fused 3D point cloud.

13. The electronic device of claim 12, wherein after generating the 3D image, the one or more processors are further configured to display 3D images at different viewing angles.

14. The electronic device of claim 12, wherein after generating the 3D image, the one or more processors are further configured to:
receive a viewing angle conversion operation from the user on the 3D image; and
display a second 3D image at a first viewing angle corresponding to the viewing angle conversion operation.

15. The electronic device of claim 12, wherein the one or more processors are further configured to:
obtain a pixel depth of each pixel in the primary camera image and the wide-angle image through depth prediction by a neural network; and
obtain the binocular point cloud based on the pixel depth.

16. The electronic device of claim 12, wherein the one or more processors are further configured to unify the first calibrated point cloud, the second calibrated binocular point cloud, and the first point cloud in a same coordinate system through a camera parameter conversion.

17. The electronic device of claim 12, wherein the one or more processors are further configured to:
obtain the full-scene 3D point cloud corresponding to a first conversion viewing angle;
perform image rendering and supplement based on the full-scene 3D point cloud to form a first two-dimensional (2D) image corresponding to the first conversion viewing angle;
switch different conversion viewing angles;
generate 2D images at corresponding viewing angles; and
form the 3D image using a plurality of frames of the 2D images.

18. The photographing method of claim 1, further comprising obtaining the first point cloud, the second point cloud, and the binocular point cloud separately.

19. The image processing method of claim 10, further comprising obtaining the first point cloud, the second point cloud, and the binocular point cloud separately.

20. The electronic device of claim 12, wherein the one or more processors are further configured to obtain the first point cloud, the second point cloud, and the binocular point cloud separately.

* * * * *

UNITED STATES PATENT AND TRADEMARK OFFICE
CERTIFICATE OF CORRECTION

PATENT NO. : 12,309,342 B2
APPLICATION NO. : 18/004140
DATED : May 20, 2025
INVENTOR(S) : Tianluo Chen et al.

Page 1 of 1

It is certified that error appears in the above-identified patent and that said Letters Patent is hereby corrected as shown below:

In the Claims

Claim 12, Column 25, Line 52: "bycloud by:" should read "by:"

Signed and Sealed this
Twenty-fourth Day of June, 2025

Coke Morgan Stewart
*Acting Director of the United States Patent and Trademark Office*